(12) United States Patent
Liang et al.

(10) Patent No.: US 8,964,884 B2
(45) Date of Patent: Feb. 24, 2015

(54) POWER CONTROL IN LINEAR PRECODER DESIGN FOR MIMO DSL TRANSMISSION

(71) Applicant: Futurewei Technologies, Inc., Plano, TX (US)

(72) Inventors: Xiao Liang, Nanjing (CN); Chin Ngek Hung, San Jose, CA (US); Haixiang Liang, Atherton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 16 days.

(21) Appl. No.: 13/732,219

(22) Filed: Dec. 31, 2012

(65) Prior Publication Data

US 2014/0185701 A1    Jul. 3, 2014

(51) Int. Cl.
| | |
|---|---|
| H04L 27/00 | (2006.01) |
| H04B 7/04 | (2006.01) |
| H04B 3/00 | (2006.01) |
| H04B 3/32 | (2006.01) |
| H04M 3/34 | (2006.01) |
| H04M 11/06 | (2006.01) |

(52) U.S. Cl.
CPC .............. *H04B 7/0456* (2013.01); *H04B 3/00* (2013.01); *H04B 3/32* (2013.01); *H04M 3/34* (2013.01); *H04M 11/062* (2013.01)
USPC ......... 375/295; 375/296; 398/193; 455/114.3

(58) Field of Classification Search
None
See application file for complete search history.

(56) References Cited

U.S. PATENT DOCUMENTS

| | | | |
|---|---|---|---|
| 2012/0020418 A1 | 1/2012 | Sands et al. | |
| 2012/0219085 A1* | 8/2012 | Long et al. | 375/295 |
| 2013/0010880 A1* | 1/2013 | Koivisto et al. | 375/259 |
| 2014/0119468 A1* | 5/2014 | Huang et al. | 375/267 |
| 2014/0133534 A1 | 5/2014 | Shi | |

FOREIGN PATENT DOCUMENTS

| | | |
|---|---|---|
| CN | 102318299 A | 1/2012 |
| CN | 102318302 A | 1/2012 |

OTHER PUBLICATIONS

"Series G: Transmission Systems and Media, Digital Systems and Networks, Digital Sections and Digital Line System-Access Networks, Very High Speed Digital Subscriber Line Transceivers 2 (VDSL2)," ITU-T G. 993.2, Feb. 2006, 252 pages.
Boccardi, F., et al., "Optimum Power Allocation for the MIMO-BC Zero-Forcing Precoder with Per-Antenna Power Contraints," 40th Annual Conference on Information Sciences and Systems, Mar. 22-24, 2006, p. 504.

(Continued)

*Primary Examiner* — Adolf Dsouza
(74) *Attorney, Agent, or Firm* — Conley Rose, P.C.; Grant Rodolph; William H. Dietrich

(57) ABSTRACT

An apparatus configured to couple to a plurality of subscriber lines comprising a plurality of transmitters configured to couple to a plurality of physical channels and at least one virtual channel. The number of physical channels equals the number of subscriber lines. A processor is configured to compute a precoder matrix to minimize an error value. The error value accounts for an error on each channel subject to a constraint on power for each channel. A precoder is coupled to the processor and configured to use the precoder matrix to jointly process a plurality of data signals to generate a plurality transmit signals for the plurality of physical channels and the at least one virtual channel.

17 Claims, 19 Drawing Sheets

(56) References Cited

OTHER PUBLICATIONS

Cendrillon, R., et al., "The Linear Zero-Facing Crosstalk Canceler is Near-Optimal in DSL Channels," Global Telecommunications Conference, 2004, Globecom, IEEE Communications Society, 2004, vol. 4, pp. 2334-2338.

Cioffi, J.M., et al., "Greener Copper with Dynamic Spectrum Management," Global Telecommunications Conference, IEEE Globecom 2008, Nov. 30, 2008-Dec. 4, 2008, 5 pages.

Ginis, G., et al., "Vectored Transmission for Digital Subscriber Line Systems," IEEE Journal on Selected Areas in Communications, vol. 20, No. 5, Jun. 2002, pp. 1085-1104.

Le Nir, V., et al., "Optimal Power Allocation Under Per-Modem Total Power and Spectral Mask Constraints in XDSL Vector Channels with Alien Crosstalk," IEEE International Conference on Acoustics, Speech, and Signaling Processing, Apr. 15-20, 2007, vol. 3, pp. III 357-III 360.

Leshem, A., et al., "A Low Complexity Coordinated FEXT Cancellation for VDSL," Proceedings of the 2004 11th International Conference on Electronics, Circuits, and Systems, Dec. 13-15, 2004, pp. 338-341.

Leshem, A., et al., "A Low Complexity Linear Precoding technique for Next Generation VDSL Downstream Transmission Over Copper," IEEE Transactions on Signal Processing, vol. 55, No. 11, Nov. 2007, pp. 5527-5534.

Wiesel, A., et al., "Zero-Forcing Precoding and Generalized Inverses," IEEE Transactions on Signal Processing, vol. 56, No. 9, Sep. 2008, pp. 4409-4418.

Youming, L., et al., "Computationally Efficient Approximated Matrix Inversion with Application to Crosstalk Precoding in Downstream VDSL," International Conference on Wireless Communication and Mobile Computing, Aug. 12-16, 2007, pp. 429-433.

Yu, W., et al., "Transmitter Optimization for the Multi-Antenna Downlink with Per-Antenna Power Constraints," IEEE Transactions on Signal Processing, vol. 55, No. 6, Jun. 2007, pp. 2646-2660.

Partial English Translation and Abstract of Chinese Patent Application No. CN102318299A, Part 1, Jul. 3, 2014, 6 pages.

Partial English Translation and Abstract of Chinese Patent Application No. CN102318299A, Part 2, Jul. 3, 2014, 3 pages.

Foreign Communication From a Counterpart Application, PCT Application No. PCT/CN2013/091002, International Search Report dated Mar. 27, 2014, 11 pages.

Foreign Communication From a Counterpart Application, PCT Application No. PCT/CN2013/091002, Written Opinion dated Mar. 27, 2014, 3 pages.

"G.gen: G.vdsl: ADSL: A Proposal for a Stable Low Power Mode," ITU—Telecommunication Standardization Sector, Study Group 15, Bordeauz, France, Question 4/15, BF-054, Dec. 3-7, 2007, 2 pages.

\* cited by examiner

POWER CONTROL IN LINEAR PRECODER DESIGN FOR MIMO DSL TRANSMISSION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. DSL systems may transmit and receive data over pairs of twisted copper wires. Examples of DSL technologies include those defined by standards including asymmetric DSL 2 (ADSL2); very-high-speed DSL (VDSL); very-high-speed DSL 2 (VDSL2); G.vector; and G. fast, which is a future standard to be issued by the International Telecommunication Union Telecommunication Standardization Sector (ITU-T) Study Group 15 (SG15). These broadband access communication technologies may provide data for triple-play services, including television, Internet, and voice over Internet protocol (VOIP) phones. Because of the increasing use of such services, there is a need to increase data rates to meet user demands.

As data rates increase and the corresponding systems become more complex, other issues may arise. For example, when transmitting data over subscriber lines, crosstalk (XT) interference may occur between the transmitted signals over adjacent twisted-pair subscriber lines in a same or nearby bundle of lines. Crosstalk may generally refer to a signal on one wire or cable causing an undesired effect on another wire or cable. Near-end crosstalk (NEXT) may refer to crosstalk at the same end of the wire or cable as the transmitter. Far-end crosstalk (FEXT) may refer to crosstalk at the other end of the wire or cable as the transmitter. Crosstalk, including NEXT and FEXT, may limit the performance of various DSL systems. For example, although channel capacity in the physical media dependent (PMD) layer of a DSL system may be high (e.g., near gigabits in G.fast) with a single subscriber line, when multiple subscriber lines are deployed in a same binder, the actual data rate may be lower than the channel capacity due to NEXT and/or FEXT.

SUMMARY

In one embodiment, the disclosure includes an apparatus configured to couple to a plurality of subscriber lines, the apparatus comprising a plurality of transmitters configured to couple to a plurality of physical channels and at least one virtual channel, wherein the number of physical channels equals the number of subscriber lines, a processor configured to compute a precoder matrix to minimize an error value, wherein the error value accounts for an error on each channel subject to a constraint on power for each channel; and a precoder coupled to the processor and configured to use the precoder matrix to jointly process a plurality of data signals to generate a plurality of transmit signals for the plurality of physical channels and the at least one virtual channel.

In another embodiment, the disclosure includes a method comprising receiving, by a plurality of receivers, a plurality of channel estimates comprising a channel estimate for each of a plurality of channels, computing a block diagonal matrix for a precoder matrix to minimize an error value subject to a per-channel constraint on signal power, and computing the precoder matrix based on the block diagonal matrix and the channel estimates.

In yet another embodiment, the disclosure includes an apparatus comprising a plurality of receivers configured to receive a plurality of channel estimates comprising a channel estimate for each of a plurality of channels, and a processor configured to compute a block diagonal matrix for a precoder matrix to minimize an error value subject to a per-channel constraint on signal power, and compute the precoder matrix based on the block diagonal matrix and the channel estimates.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
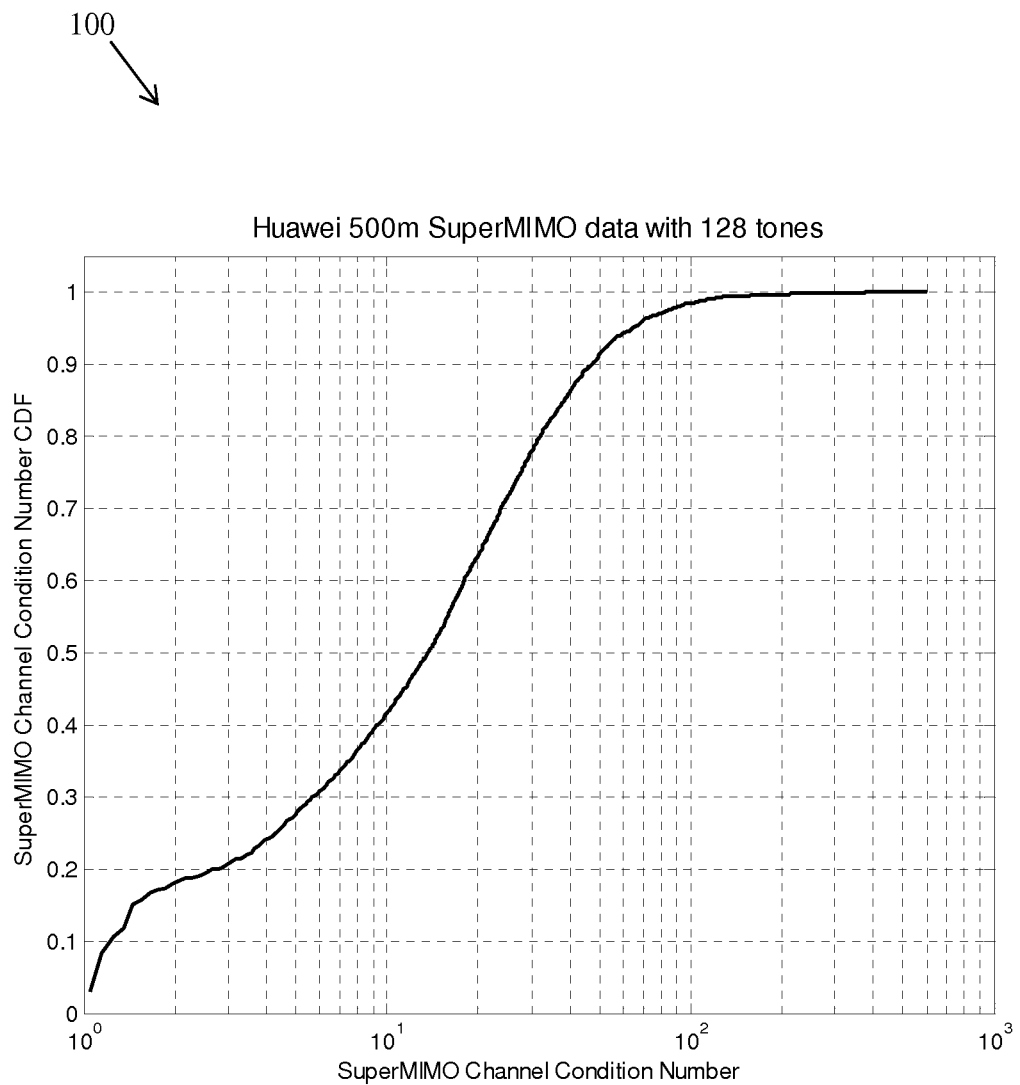
FIG. 1 is a graph of characteristics of a conventional SuperMIMO system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To further increase the link connection speed to customer premises equipment, vector transmission of multiple links over multi-pair bonding channels becomes an attractive technology. For better spectral efficiency, "SuperMIMO" may further increase the access bandwidth that a conventional multiple input and multiple output (MIMO) DSL system may provide. MIMO may refer to a technique in which a user may be allocated multiple simultaneous data streams in order to improve performance, such as data rate. A transmitter may transmit multiple streams to a user, and the user may jointly process the streams for improved performance. SuperMIMO was described in United States Patent Application Publication Number 2012/0219085 to Long, et al., entitled "Extremely High Speed Broadband Access Over Copper Pairs," which is incorporated by reference as if reproduced in its entirety. In short, a SuperMIMO system may comprise, in addition to the regular physical copper pairs, virtual pairs using common mode or other technologies. In contrast, conventional MIMO may allocate multiple copper pairs per subscriber or customer premises equipment, but no virtual pairs. Both conventional MIMO and SuperMIMO may, however, encounter at least two issues. The issues may be particularly acute in SuperMIMO systems.

The first issue is that SuperMIMO may cause increased XT because of more severe inter-channel coupling. For downstream signaling, FEXT may be of particular concern. When multiple customer premises equipment (CPE) signals are simultaneously transmitted downstream, FEXT leads to interfering signals at the CPE receivers. Measurement of the SuperMIMO channel matrix indicates that the FEXT among virtual channels (sometimes referred to as common mode, or CM) of different CPEs and between their virtual channels and native channels (sometimes referred to as differential mode, or DM) is often far greater than the FEXT among DM channels. In some frequency bands, the amplitude of the XT transfer function may be even greater than that of the native DM channel transfer function. The increased XT reflects high correlation among virtual channels and often manifests itself in the form of a lower channel matrix condition number. Because each CPE is designed and authorized to detect and decode its own signals, joint detection and signal separation cannot be implemented by distributed receivers. As a result, transmit precoding for FEXT pre-cancellation may provide a solution. In particular, a zero-forcing precoder may be used.

FIG. 1 is a graph 100 of characteristics of a conventional SuperMIMO system. In particular, the graph shows the cumulative distribution function (CDF) of the channel condition number of a typical 500 meter (m) SuperMIMO channel. The x-axis may represent the SuperMIMO channel condition number, and the y-axis may represent the SuperMIMO channel condition number CDF. As shown, over 10% of the SuperMIMO channels may have a condition number above 50. In some cases, the condition number may exceed 600.

The second issue is that each physical line in a SuperMIMO system may have power-limited amplifiers for each physical line. Such power limitations may lead to non-linear distortion, which in turn may negatively affect the orthogonal relation among CPEs and eventually degrade each CPE's signal to interference plus noise ratio (SINR). Also, given the potentially high condition number of the vector MIMO channel matrix, a zero-forcing precoder may result in a wide range of power output for each channel.

Figure 2:
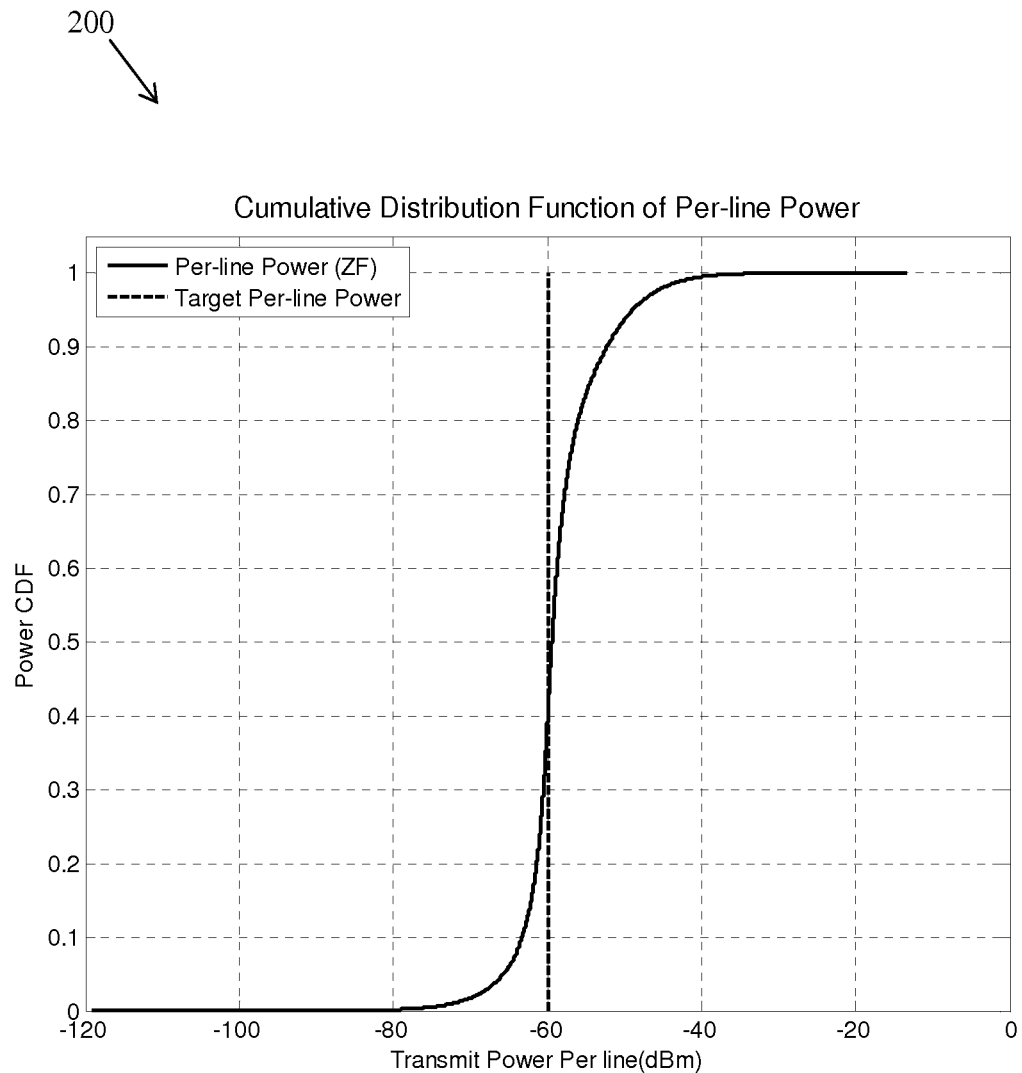
FIG. 2 is another graph of characteristics of a conventional SuperMIMO system.

FIG. 2 is another graph 200 of characteristics of a typical SuperMIMO system. In particular, the graph shows the CDF of per-line power in a SuperMIMO system. The x-axis may represent transmit power per line, and the y-axis may represent the power CDF. As shown, the per-channel output power after precoding may vary widely. Almost 50% of the power may be greater than a power target of −60 dBm (power in decibels relative to 1 milliwatt)+1.5 dB (meaning if power p is −60 dBm, the maximum power $p_{max}$ of each line should not exceed $10^{0.15}*p$) and some power may be as much as 10,000 times above the target per-channel power limit. Therefore, in addition to being desirable to suppress FEXT in SuperMIMO systems, it may be desirable to control the per-channel power.

Disclosed herein are systems and methods for improving the operation of MIMO and SuperMIMO systems by addressing XT and power control issues. A block diagonal matrix is derived subject to constraints on transmit power and introduced into a precoder design. The block diagonal matrix may be concatenated with a zero-forcing equalizer to form a robust precoder. Various derivations of the block diagonal matrix are presented that provide a range of complexity and performance tradeoffs. A precoder as disclosed herein may therefore achieve more balanced rate assignment and more balanced power allocation among links as compared with conventional precoder designs.

Figure 3:
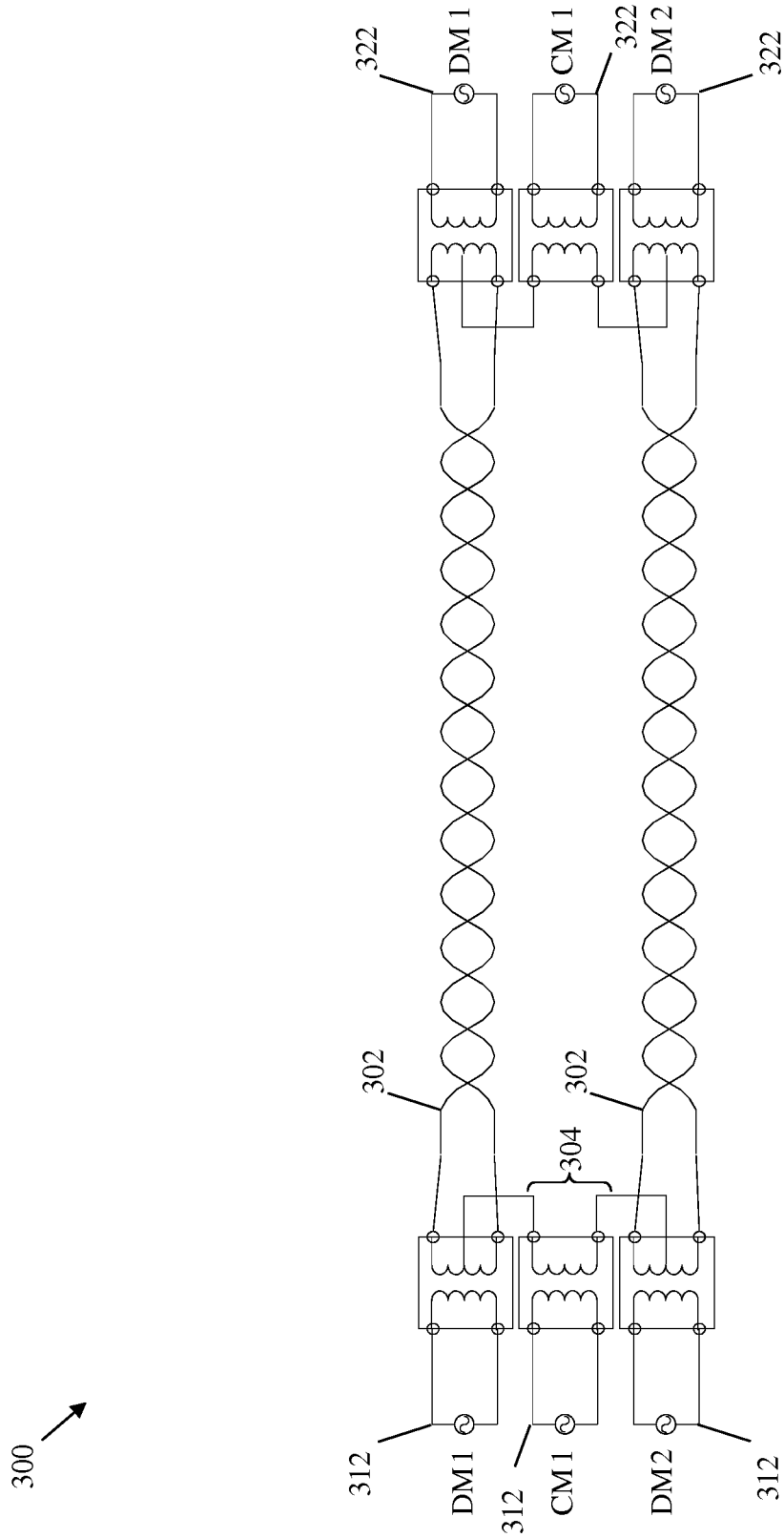
FIG. 3 is a schematic diagram of an embodiment of a SuperMIMO system.

FIG. 3 is a schematic diagram of an embodiment of a SuperMIMO system 300. A time division multiple access (TDMA) MIMO or frequency division multiple access (FDMA) MIMO scheme may be implemented in the SuperMIMO system 300. TDMA systems may divide a signal into different time slots, and FDMA systems may divide a signal into different frequency bands. The SuperMIMO system 300 may have multiple ports coupled to multiple copper pairs for multiple users, wherein the multiple copper pairs form a vectored group. A "phantom mode" or "SuperMIMO mode" may be implemented in the SuperMIMO system 300, where, in addition to the regular physical copper pairs, virtual pairs may be generated from multiple twisted-pairs using common mode or other technologies.

For the purpose of illustration, suppose there are three transceivers 312 that may be coupled to three corresponding transceivers 322 via two copper physical pairs 302 and one virtual pair 304. The physical pairs 302 may be established using a DM in each of the physical pairs 302 (e.g., DM1 and DM2), and the virtual pair 304 may be established according to a SuperMIMO technique, e.g., combining a CM of one of the physical pairs 302 and a CM of the other physical pair 302. Thus, the transceivers 312 may communicate with the transceivers 322 via two physical channels that correspond to the physical pairs 302 and one virtual channel that corresponds to the virtual pair 304. In effect, two copper pairs may provide three communication channels. The three communication channels may be provided to a single user or CPE.

Although FIG. 3 shows only two physical copper pairs, in practice there may be N copper pairs, where N is an integer. In this case, the transceivers on the two ends of the N physical pairs may be coupled by up to 2N-1 corresponding pairs. The 2N-1 pairs may include N physical pairs and up to N-1 virtual pairs. Each virtual pair may be obtained by combining two of the physical wires other than the regular physical pair, or two common mode wires from two other physical or virtual pairs, or using other techniques, to substantially increase the number of channels between the transceivers and thus the total data rate between the transceivers by a factor of up to about (2N-1)/N. The physical copper wires may be combined to form the virtual pairs in addition to the regular physical pairs using various techniques such as SuperMIMO. In effect, N copper pairs may provide 2N-1 communication channels. Stated another way, N copper pairs may be used to communicate 2N-1 data streams. As one of skill in the art will readily recognize, conventional MIMO may be viewed as a special case of SuperMIMO in which there are no virtual pairs or channels, whereas N physical pairs or channels may be allocated per user or CPE.

Figure 4:
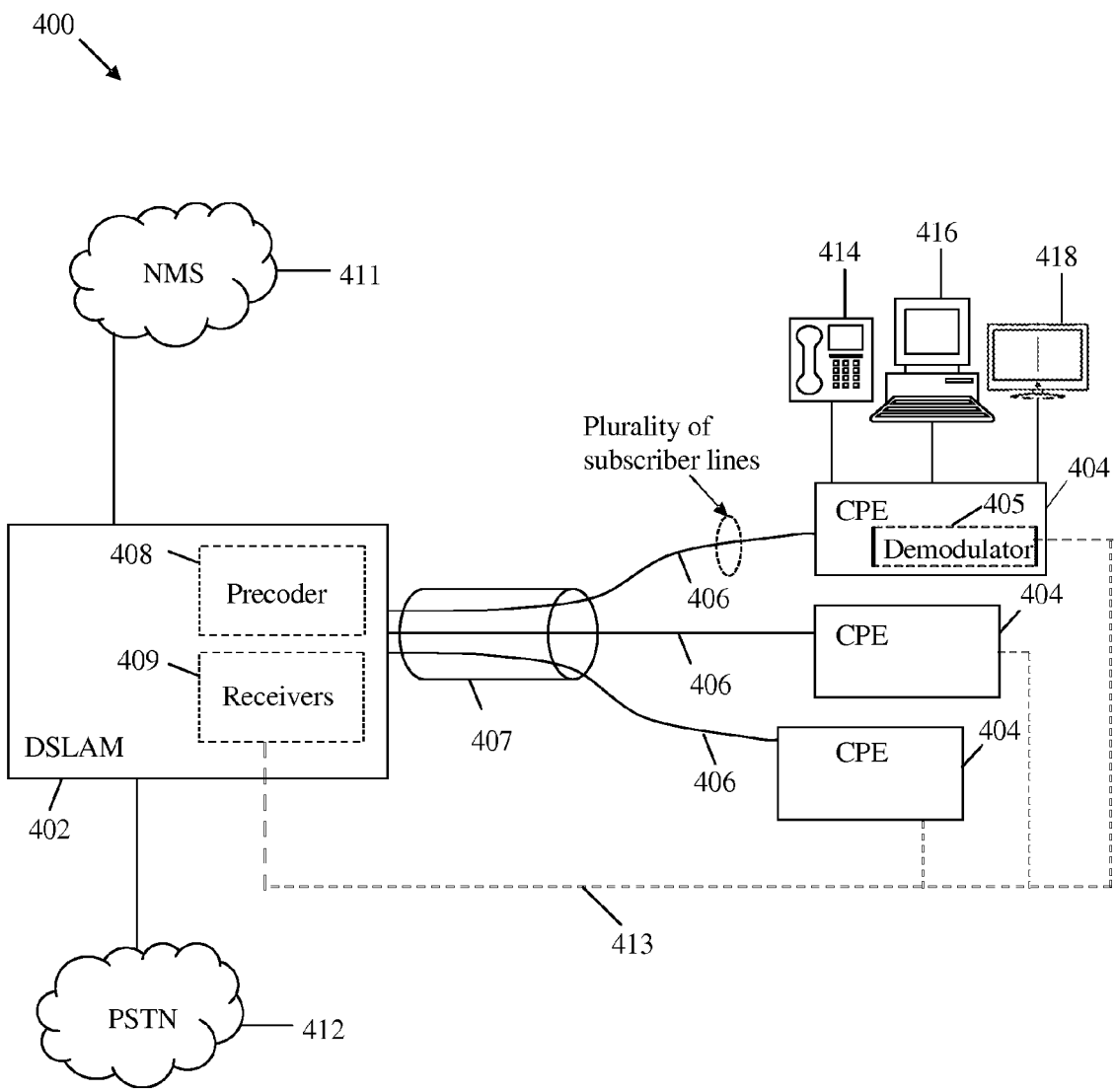
FIG. 4 is an embodiment of a DSL system.

FIG. 4 illustrates a schematic diagram of an embodiment of a DSL system 400 in which embodiments of the present disclosure may be implemented. The DSL system 400 may be a VDSL2 system, an ADSL2 system, an ADSL2+ system, or any other DSL system (e.g., systems to be defined in the ITU-T G.fast standard). The DSL system 400 may comprise a digital subscriber line access multiplexer (DSLAM) 402 and a plurality of CPEs 404. The CPEs may be coupled to the DSLAM 402 via a plurality of subscriber lines 406. Although illustrated logically as a single line connecting each CPE 404 to the DSLAM 402, each one of the lines 406 represents a plurality of subscriber lines connected to each CPE 404. Each CPE 404 may be allocated N copper pairs, and communication between the DSLAM 402 and a CPE 404 may utilize up to 2N-1 data streams according to a SuperMIMO scheme, or, in the case of conventional MIMO, each CPE may utilize up to N data streams. The DSLAM 402 may be located on an operator end of the DSL system 400, such as a central office (CO), an exchange, a distribution center, or a cabinet. The CPEs 404 may be located on a remote or subscriber end. At least some of the subscriber lines 406 may be bundled in a binder 407. In an embodiment, the DSLAM 402 comprises a precoder 408, which may be configured to reduce or cancel downstream FEXT, and a plurality of receivers 409, which may be configured to receive channel estimates from each of the CPEs 404. The precoder 408 may pre-distort downstream signals, which are then transmitted downstream to the CPEs 404 via the subscriber lines 406.

Each of the CPEs 404 may comprise a demodulator 405, which may be configured to equalize the downstream signals as well as generate channel estimates. The demodulator 405 may be coupled to the plurality of receivers 409 via a plurality of feedback channels 413. The feedback channels 413 (shown in dotted lines) may correspond to upstream logical data paths from the CPEs 404 to the DSLAM 402 and may not be physically separated from the subscriber lines 406 (shown in solid lines). Additionally, the DSLAM system 402 may optionally comprise a network management system (NMS) 411 and a public switched telephone network (PSTN) 412. The NMS 411 may be a network management infrastructure that processes data exchanged with the DSLAM 402 and may be coupled to one or more broadband networks, such as the Internet. The PSTN 412 may be a network that generates, processes, and receives voice or other voice-band signals.

The precoder 408 may be configured to reduce or limit the crosstalk in the lines. The precoder 408 may transmit pre-distorted downstream signals in the subscriber lines 406 to cancel or reduce crosstalk error in the lines. The precoder 408 may process a plurality of downstream signals from a transmitter in the DSLAM 402, add distortion to the downstream signals, and transmit the pre-distorted downstream signals to the CPEs 404 via the subscriber lines 406, which may represent physical channels and virtual channels in a SuperMIMO system. The pre-distorted signals may be generated by the precoder 408 which may be selected according to this disclosure. In order for the precoder 408 to be determined properly, the CPEs 404 may send back channel estimates (or error signals from which channel estimates may be derived in the DSLAM 402) in the downstream receivers as feedback for the precoder 408 to be determined. For instance, a plurality of transceivers at the CPEs 404 may measure the errors for a plurality of received symbols, such as digital multi-tone (DMT) symbols received from the precoder 408, and transmit back to the DSLAM 402 a plurality of corresponding error feedback signals via the feedback channel 413. The feedback channel 413 may be established through upstream data signal paths from the CPEs 404 to the DSLAM 402, which may be provided in addition to upstream communications data.

In an embodiment, the CPEs 404 may be located at the customer premises, where at least some of the CPEs 404 may be coupled to a telephone 414, a computer 416, and/or a television 418. The telephone 414 may be hardware, software, firmware, or any combination thereof that generates, processes, and receives voice or other voice-band signals. The CPE 404 may comprise a switch and/or a splitter, which may couple the subscriber lines 406 and the telephone 414, the computer 416, and the television 418.

For the purposes of illustration, it is assumed that DSLAM 402 is configured to serve K users, each of which is allocated two copper pairs and one virtual pair (i.e., three communication channels using two copper pairs), with the understanding that the analysis also applies generally to a conventional MIMO architecture in which there are no virtual pairs. However, one of skill in the art will readily appreciate the applicability of the disclosure to K users, each of which is allocated N copper pairs and N-1 virtual pairs.

In the description below, the following conventions and assumptions may apply:
1. Regular letters denote scalar parameters and signals.
2. Bold lower-case and bold upper-case symbols denote vectors and matrices, respectively.
3. Superscripts $(\cdot)^*$, $(\cdot)^T$, and $(\cdot)^\dagger$ denote the conjugate, transpose, and conjugate transpose, respectively.
4. $\text{Tr}(\cdot)$ is the trace of a matrix.
5. $\|BA\| = \sqrt{\text{Tr}(AA^\dagger)}$ is the Frobenius norm of A.
6. $\text{diag}(\cdot)$ is a diagonalization operation.
7. $E\{\cdot\}$ denotes statistical expectation.
8. $e_i$ is an all-zeros column vector, except the ith element is 1.
9. $I_k$ is the identity matrix with k dimension.
10. $\otimes$ is the Kronecker product operator.
11. $a \geq 0$ denotes that each element of a is not negative.
12. Both $B \geq A$ and $B - A \geq 0$ denote $B - A$ is a positive, semi-definite matrix.
13. DMT modulation is employed. A channel model with one tone per DMT symbol is considered for illustrative purposes. (One of skill in the art can readily extend the analysis for a general number of subcarriers L per DMT symbol, where L is an integer that satisfies $L \geq 1$. A separate optimization may be carried out for each subcarrier.)

In a SuperMIMO VDSL architecture with K subscribers (herein, in this context, "K subscribers" refers to the scenario that there are K subscriber devices or K CPEs), the received vectors of the ith subscriber may be represented as $$Y_i = H_i P X + N_i,$$

where X comprises the source signals for all subscribers. The source signals may, for example, originate from a CO or a DSLAM. For convenience, X may be partitioned in terms of subscriber index as follows:

$$X=[X_1^T,\ldots,X_K^T]^T.$$

$X_i$ is the source signal for subscriber i, which consists of 3 lines of length M (i.e., each data stream comprises M symbols) as follows:

$$X_i=[\vec{x}_1^T\,\vec{x}_2^T\,\vec{x}_3^T]^T, (i=1,\ldots,K).$$

Supposing streams are independent and zero mean, the covariance of the streams is $$\mathbb{E}\,(XX^\dagger)=p\cdot M\cdot I_{3K},$$

where p is the power of each stream. At the CPE terminal for user i, $Y_i$ comprises 3-by-M received vectors, the corresponding sub-channel $H_i$ is a 3-by-3K complex matrix, and $N_i$ is a 3-by-M background noise matrix, whose elements are independent and modeled as having a complex Gaussian distribution with zero mean and variance $\sigma_i^2$ (i.e., $\sigma_i^2$ may represent the noise level of the ith subscriber). The matrix P represents a 3K-by-3K precoder for the downlink channel of all subscribers. The integrated downlink received vectors for K subscribers may be represented by the following:

$$Y=[Y_1^T,\ldots,Y_k^T]^T=HPX+N, \quad (2)$$

where H and N are stacked sub-channels and noise vectors, respectively, and represented as $$H=[H_1^T,\ldots,H_K^T]^T$$

and $$N=[N_1^T,\ldots,N_K^T]^T.$$

As one of skill in the art will readily recognize, for a conventional MIMO architecture with no virtual channels, the framework presented here applies in a straightforward manner. In a conventional MIMO architecture using the example of two copper pairs per subscriber or CPE, for user i, $Y_i$ comprises 2-by-M received vectors, the corresponding sub-channel $H_i$ is a 2-by-2K complex matrix, $N_i$ is a 2-by-M background noise matrix, and P is a 2K-by-2K precoder.

It may be assumed that SuperMIMO channel H (or an estimate thereof) is available at the CO and is non-singular. The non-singularity assumption holds for channels of proper size and condition number. The channel H may be estimated at the CO or DSLAM during a training phase according to CPE error feedback.

A proposed linear precoder may have the following structure:

$$P=H^{-1}\cdot B, \quad (3)$$

where matrix B is a block diagonal complex matrix as follows:

$$B=\mathrm{diag}(B_1,\ldots,B_K). \quad (4)$$

Each block $B_i$ is a 3-by-3 complex matrix. The proposed precoder may cancel a significant amount of channel XT, but may introduce new XT among channels that belong to the same CPE downstream. Precoder-introduced extra XT may be limited locally such that each CPE may jointly detect and decode its data symbols without being significantly affected by inter-user XT. Substituting (4) into (3) and (3) into (1) and assuming that $H_i\cdot H^{-1}=[0_{3,3(i-1)}, I_3, 0_{3,3(K-i)}]$, the following simplified received vector $Y_i$ may be obtained:

$$Y_i=B_iX_i+N_i. \quad (5)$$

It may be assumed that CPE, employs a linear equalizer denoted as $F_{eqi}$. The linear equalizer $F_{eqi}$ may depend on the selection of precoder P. In a training stage, the following precoder may be applied:

$$P=I,$$

which may result in the following equalizer:

$$F_{eqi}=[\mathrm{diag}([H_i])_{3\times(i-1):I,(i-1):i)}]^{-1}.$$

In a show time stage and assuming a zero-forcing equalizer in each CPE, such as CPEs 404, $F_{eqi}$ may be represented in equation (8) below when the precoder P has the form given by equations (3) and (4). For a zero-forcing CPE equalizer, an estimated source signal of the ith subscriber may be $$\begin{aligned}\hat{X}_i &= F_{eqi}Y_i \quad &(6)\\ &= F_{eqi}B_iX_i+F_{eqi}N_i \\ &\stackrel{ZF}{=} X_i+B_i^{-1}N_i. \quad &(7)\end{aligned}$$

The second step above may be obtained by substituting (5) in (6). For the third step above, it may be assumed that the ith equalizer $F_{eqi}$ works in the zero-forcing manner such that $$F_{eqi}=B_i^{-1}. \quad (8)$$

A goal may be to minimize a sum of mean squared error (MSE) $E\|\hat{X}-X\|^2$ of all lines as follows:

$$\min_{B_1,\ldots,B_K}E\|\hat{X}-X\|^2, \quad (9)$$

subject to the following constraints:

$$\|P^\dagger e_j\|^2\leq 1, (j=1,\ldots,3K)$$

$$P=H^{-1}B$$

$$B=\mathrm{diag}(B_1,\ldots,B_K)$$

$$B_i\in C^{3\times 3} \quad (10)$$

Solving this optimization problem can minimize the MSE at the CPEs where zero-forcing receivers are implemented for signal detection.

To solve (9) subject to the constraints in (10), the sum MSE of all lines $E\|\hat{X}-X\|^2$ may be further written as follows:

$$\begin{aligned}E\|\hat{X}-X\|^2 &\stackrel{(1)}{=} \sum_{i=1}^{K}\mathbb{E}\|\hat{X}_i-X_i\|^2 \\ &\stackrel{(2)}{=} \sum_{i=1}^{K}Tr\big(B_i^{-1}N_iN_i^\dagger(B_i^{-1})^\dagger\big)\\ &\stackrel{(3)}{=} M\sum_{i=1}^{K}Tr\big(\sigma_i^2(B_i^\dagger B_i)^{-1}\big)\\ &\stackrel{(4)}{=} M\sum_{i=1}^{K}Tr\big(\sigma_i^2(B_iB_i^\dagger)^{-1}\big).\end{aligned}$$

The first step above may be based on the independent assumption of source signals. The second step above is from using (7). The third step above is based on the noise distribution assumption above. The fourth step above is based on the fact that Tr(AB)=Tr(BA). The per-channel power constraint (10) may be rewritten as follows:

$$\|P^*e_j\|^2 \stackrel{(1)}{=} e_j^\dagger H^{-1} BB^\dagger (H^{-1})^\dagger e_j$$
$$\stackrel{(2)}{=} \sum_{i=1}^{K} Tr((H_i^{-1})^\dagger e_j e_j^\dagger H_i^{-1} B_i B_i^\dagger).$$

The first step above is based on (3). The second step above is based on (4). The channel inverse precoder $H^{-1}$ is partitioned according to subscriber index as follows:

$$H^{-1} = [H_1^{-1}, \ldots, H_K^{-1}].$$

To further simplify, the 3-by-3 positive semi-definite complex matrix may be defined as follows:

$$Q_i \triangleq B_i B_i^\dagger. \tag{11}$$

The rank-one positive semi-definite matrix $R_{ij}$ may be defined as follows:

$$R_{ij} \triangleq (H_i^{-1})^\dagger e_j e_j^\dagger H_i^{-1}.$$

Based on the above, (9) may be formulated into the standard semi-definite programming (SDP) form $$\min_{Q_i(i=1 \ldots K)} c^T t, \tag{12}$$

subject to the following constraints:

$$t = [t_1, \ldots, t_{3K}]^T \geq 0$$

$$\begin{bmatrix} t_{3+j+i} & e_j^\dagger \\ e_j & Q_i \end{bmatrix} \geq 0,$$

$$(i = 1 \ldots 3, j = 1 \ldots K)$$

$$\sum_{i=1}^{K} Tr(R_{ij} Q_i) \leq 1,$$

$$(l = 1 \ldots 3K),$$

where $c = [\sigma_1^2, \sigma_2^2 \ldots, \sigma_K^2]^T \otimes [1\ 1\ 1]^T$ is related to each subscriber's noise level. This problem may be solved efficiently by off-the-shelf convex optimization software. By definition in (11), $Q_i$ is the general 3-by-3 positive semi-definite matrix $$Q_i = \begin{bmatrix} q_{i11} & q_{i22} & q_{i13} \\ q_{i12}^* & q_{i22} & q_{i23} \\ q_{i13}^* & q_{i23}^* & q_{i33} \end{bmatrix}. \tag{13}$$

$Q_i$ may have up to 6 unknown parameters, so there may be 96 total unknown parameters among 16 subscribers as an example. In general, each $Q_i$ may be a unique J×J positive semi-definite matrix, where J is the number of channels assigned to each subscriber.

In general, the constraints in equation (12) may be written as $$t = [t_1, \ldots, t_{J \times K}]^T \geq 0$$

$$\begin{bmatrix} t_{J \times j+i} & e_j^\dagger \\ e_j & Q_i \end{bmatrix} \geq 0,$$

$$(i = 1 \ldots, J, j = 1 \ldots K)$$

$$\sum_{i=1}^{K} Tr(R_{ij} Q_i) \leq 1,$$

$$(l = 1 \ldots, J \times K)$$

where J represents the number of channels assigned to each subscriber receiving device.

In order to further reduce the number of unknown parameters, additional structural constraints may be imposed on $Q_i$ as follows. As a first option, it may be assumed that each $Q_i$ is a diagonal matrix $$Q_i = \text{diag}(q_{i1}, q_{i2}, q_{i3}). \tag{14}$$

In general, with this option each $Q_i$ is a unique J×J diagonal matrix, wherein J is the number of channels assigned to each subscriber. This option may reduce the number of unknown parameters to 48 if there are 16 subscribers as an example. As a second option, it may be assumed that all subscribers on the same tone share an identical $Q_i$ as follows:

$$Q_1 = Q_2 = \ldots = Q_K. \tag{15}$$

This option may reduce the number of unknown parameters to 6 in this example. In this option, each $Q_i$ may be a J×J positive semi-definite matrix but all the $Q_i$'s are equal. Both special cases may still be solved by SDP. After obtaining $Q_i$, $B_i$ may be obtained as follows:

$$B_i = Q_i^{\frac{1}{2}}. \tag{16}$$

After determining the above parameters, the precoder may be designed by executing the following algorithm in Table 1. The algorithm applies to both conventional MIMO and SuperMIMO architectures.

TABLE 1

| Algorithm for computing a precoder. |
| --- |
| Step 1. Choose one of the forms of $Q_i$ based on (13), (14), and (15) for the number of channels J assigned to each subscriber; |
| Step 2. Obtain $Q_i$ by solving the SDP problem in (12), e.g., by using convex optimization software, such as CVX from CVX Research; |
| Step 3. Obtain $B_i$ from (16); |
| Step 4. Obtain B from (4); and |
| Step 5. Generate the precoder P from (3). |

Figure 5:
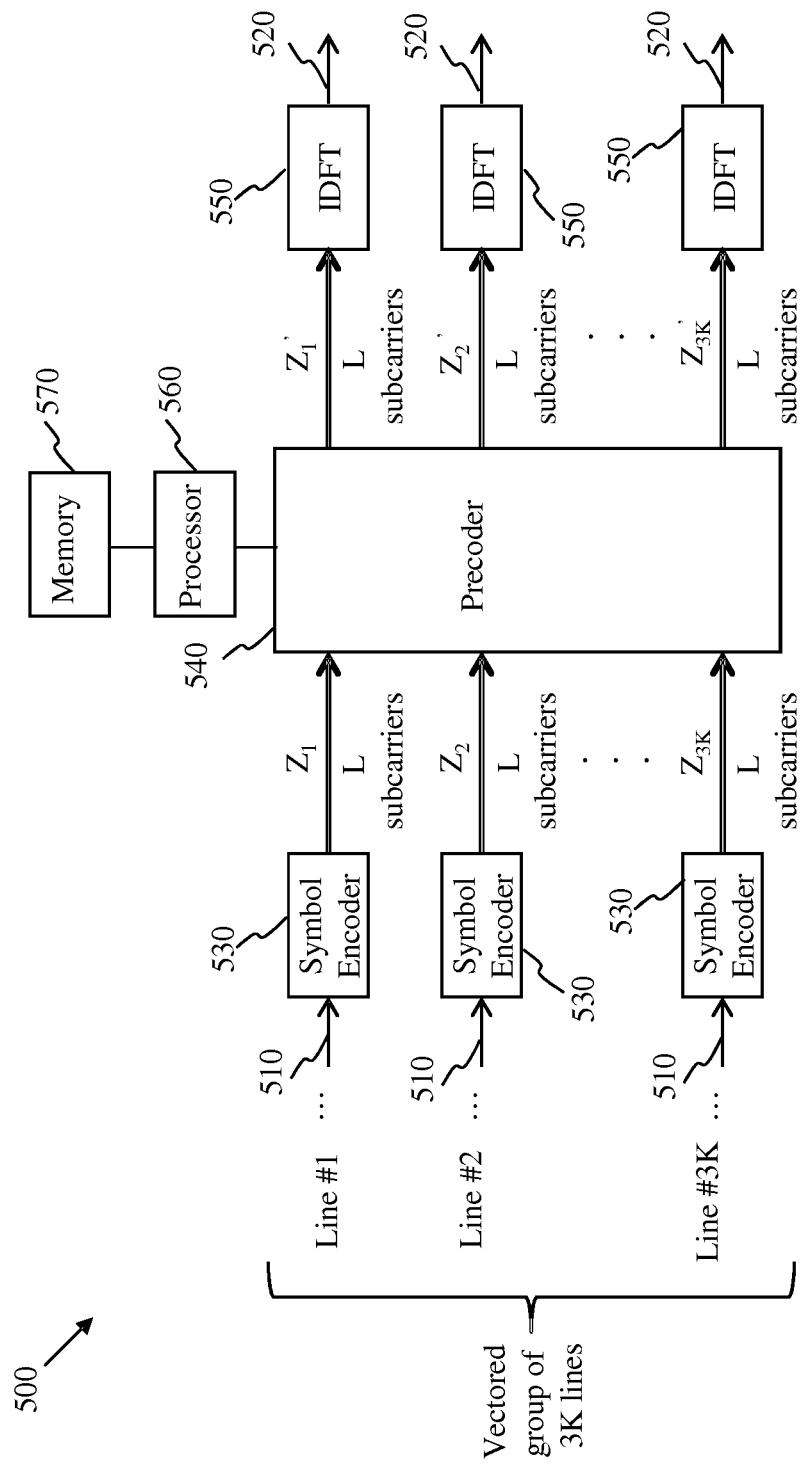
FIG. 5 is a schematic diagram of a transmitter.

FIG. 5 is a schematic diagram of a transmitter 500 configured to determine and implement a precoder according to the algorithm in Table 1. The transmitter may be configured to transmit signals downstream. The transmitter 500 may form the transmitting portions of the transceivers 312. Further, the transmitter 500 may be located at or near a CO or a DSLAM, such as the DSLAM 402. The transmitter 500 may comprise ingress subscriber lines 510, symbol encoders 530, a precoder 540, such as precoder 408, inverse discrete Fourier transform (IDFT) blocks 550, a processor 560, and a memory 570.

The transmitter 500 may be configured to receive downstream signals from 3K ingress subscriber lines 510, which may correspond to 2K physical lines and K virtual lines where K is an integer greater than one. The 3K ingress subscriber lines 510 may be considered a vectored group of lines since their signals may be jointly processed in the transmitter 500 to cancel downstream FEXT. In this embodiment, each user is assigned two subscriber lines and communicates over two physical channels and one virtual channel, for a total of three channels or data streams assigned per user. However, one of skill in the art will recognize that the transmitter 500 can be readily extended to any number of subscriber lines and channels assigned to each user. One of skill in the art will also recognize that a conventional MIMO transmitter is similar to transmitter 500 but with 2K lines using this example.

A symbol encoder 530 may correspond to each ingress subscriber line 510. Thus, incoming bit streams in the ingress subscriber lines 510, carrying data from upstream sources, may be encoded by their corresponding symbol encoders 530. The transmitter 500 uses DMT modulation. The symbol encoders 530 may divide the incoming bit streams into small groups of bits, wherein each group may be assigned to be modulated onto a sub-carrier of a DMT symbol. A number of subcarriers, or tones, in each line may be any number L, where L is an integer satisfying L≥1.

The encoded symbols may feed into the precoder 540, which is configured to linearly combine signals from the ingress subscriber lines 510 and produce signals to the IDFT blocks 550. The precoder 540 may be a MIMO system in the frequency domain. Each IDFT block 550 may be used for DMT modulation, which converts a frequency-domain signal with L carriers (or tones) to a time-domain signal. The time domain signals may be transmitted onto the egress subscriber lines 520. The time-domain signals may be intended for K CPE receivers (not shown), one for each of the K users.

The processor 560 may be configured to perform the algorithm described in Table 1 for computing the precoder P. After the precoder P is computed, the precoder P may be loaded into the precoder 540. The processor 560 may be in communication with the memory 570. Although illustrated as a single processor, the processor 560 may be implemented as one or more central processor unit (CPU) chips, one or more cores (e.g., a multi-core processor), one or more application specific integrated circuits (ASICs), and/or one or more digital signal processors (DSPs). The processor 560 may be implemented using hardware or a combination of software and hardware. The memory 570 may be configured to store data and program instructions. Data or program instructions stored in the memory 570 may be loaded into the processor 560 to convert a general-purpose processor into a special-purpose processor for implementing the algorithm described in Table 1. The memory 570 may comprise random access memory (RAM), read only memory (ROM), and/or secondary storage (e.g., disk drive or tape drive).

FIG. 5 may illustrate a subset of the components needed for transmission; thus, other components such as a modulator, demodulator, or noise canceller may also be included separately if they are not included as functions of the processor 560. In addition, though the transmitter 500 may form the transmitting portions of the transceivers 312, the transmitter 500 may share with the transceivers 312 additional components not explicitly disclosed herein such as duplexers and filters.

Figure 6:
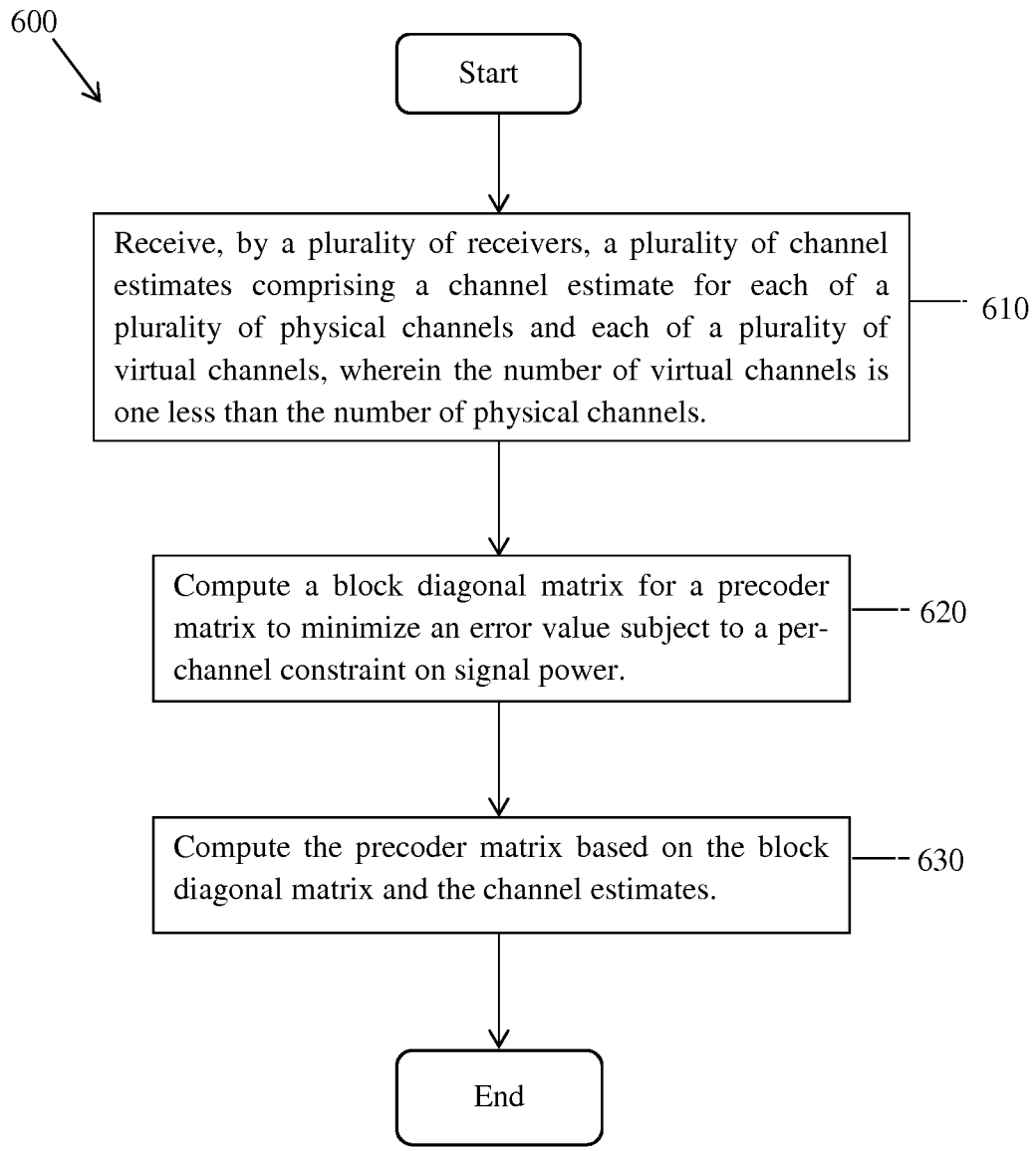
FIG. 6 is a flowchart of a method according to an embodiment of the disclosure.

FIG. 6 is a flowchart of a method 600 according to an embodiment of the disclosure. The method 600 may begin at block 610 where a plurality of receivers may receive a plurality of channel estimates comprising a channel estimate for each of a plurality of physical channels and each of a plurality of virtual channels, wherein the number of virtual channels is one less than the number of physical channels. The receivers may form the receiving portions of the transceivers 312. The channel estimates may be represented as H. The physical channels and virtual channels may correspond to the physical channels and virtual channels of the SuperMIMO system 300. At block 620, a block diagonal matrix for a precoder matrix is computed to minimize an error value subject to a per-channel constraint on signal power. The block diagonal matrix may be the matrix B above. Block 620 may encompass all or part of Steps 1 through 4 in the algorithm of Table 1. The precoder matrix may be the matrix P above and may reside in the precoder 540. The error value to be minimized may be the error value shown in (9). The per-channel constraint on signal power may be as shown in (10). At block 630, the precoder matrix may be computed based on the block diagonal matrix and the channel estimates. The precoder matrix may be computed in block 630 according to equation (3). The method 600 may be implemented in the transmitter 500. More specifically, the method 600 may be implemented in the processor 560 in FIG. 5. After the precoder matrix P is computed according to block 630, the precoder matrix P may be loaded into the precoder so that the precoder is configured to jointly process a set of 3K input signals.

The precoder described above may exhibit improved performance. To determine the performance improvements, all three proposed forms of $Q_i$ from (13), (14), and (15) may be considered. CVX software by CVX Research may be used to solve the SDP problem. Both 500 m and 200 m channels over 128 tones may be used as SuperMIMO channels. Two performance scenarios may be considered. First, the channels may be considered without FEXT and thus be referred to as "FEXT Free." This scenario is generated by setting all off diagonal elements to zero as follows:

$$H_{FEXT\ Free} = diag(H).$$

Second, the system may be measured without the precoder and thus be referred to as "No Vector." This scenario is generated by setting the precoder P=I, e.g., in equation (1). The precoder described herein may also be compared against a precoder generated with maximizing the sum rate under equal rate weight as described in "Optimum Power Allocation for the MIMO-BC Zero-Forcing Precoder with Per-antenna Power Constraints," by F. Boccardi and H. Huang, Information Sciences and Systems, 2006 40th Annual Conference on Mar. 4, 2006, which is incorporated by reference in its entirety.

While optimization across multiple tones is not considered, performance of the disclosed precoder may be measured by collecting performance information over multiple tones. Because the example SuperMIMO channel may comprise 128 tones, a second subscript may be added to some variables for tone index. It may be assumed that the noise levels, $\sigma_{i,j}^2$, of all subscribers and tones are the same.

Three performance measurements may be made. First, the SINR of each stream per-transmission may be measured at the CPEs as follows:

$$SINR_{i,j} = \frac{\|\bar{x}_{i,j}\|^2}{\|\bar{x}_{i,j} - \bar{x}_{i,j}\|^2}, \quad (17)$$

$$(i = 1, \ldots, 3K\ j = 1, \ldots, 128).$$

Second, the actual transmit power of each line per-transmission may be measured as follows:

$$p_{i,j}=\|Pe_i\vec{x}_{i,j}^T\|^2/M,$$

where M denotes be the length of stream $\vec{x}_{i,j}$. Third, the bit loading of the ith line in the jth tone may be measured by following the method stated in "Optimal Power Allocation under Per-Modem Total Power and Spectral Mask Constraints in XDSL Vector Channels with Alien Crosstalk," by V. Le Nir, M. Moonen, and J. Verlinden, Proc. IEEE Int. Conf. Acoustics, Speech, and Signal Process, 2007, pp. 357-360, which is incorporated by reference in its entirety, as follows:

$$\text{bit}_{i,j}=\min(15,\log_2(1+SINR_{i,j}/\beta)). \tag{18}$$

Equation (18) may be obtained by setting SNR_Gap=0 dB, Noise_Margin=0 dB, and Coding_Gain=0 dB where $$\beta = 10^{\frac{SNR\_Gap+Noise\_Margin-Coding\_Gain}{10}}.$$

Because there are up to 128 tones and each tone may have up to 48 lines (corresponding to 16 subscribers in these examples), the CDF of the SINR of all line channels and tones and the CDF of power may be measured as follows:

$$\underset{SINR}{CDF}(\gamma) \triangleq Pr(SINR < \gamma)$$

$$\underset{Power}{CDF}(p) \triangleq Pr(\text{Power} < p).$$

Figure 7:
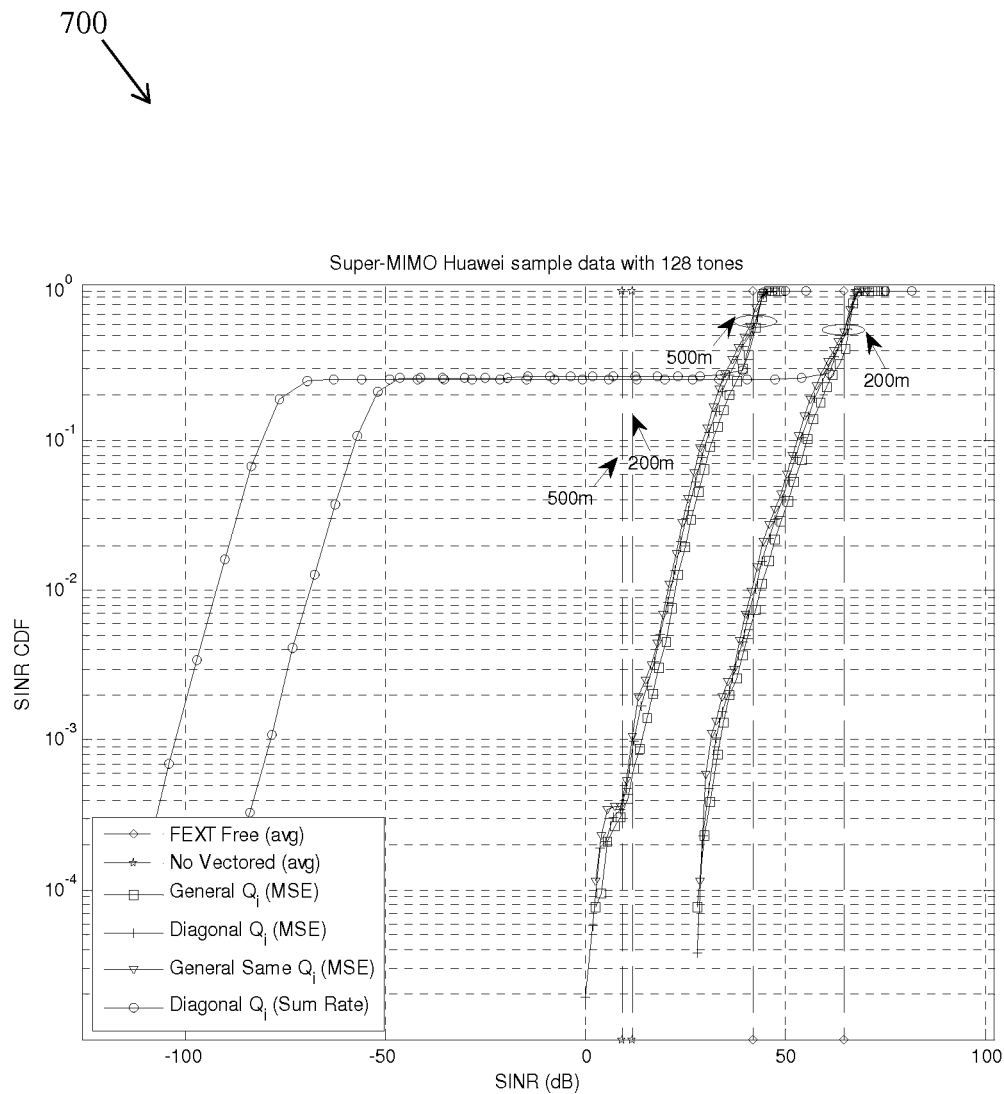
FIG. 7 is a graph comparing a cumulative distribution function (CDF) of signal to interference plus noise ratio (SINR) of a system employing various precoding options.

FIG. 7 is a graph 700 comparing the CDF of the SINR of a system with no FEXT, a no-vectored system, systems employing the disclosed precoder (i.e., MSE), and a system employing the prior art (i.e., Sum Rate), all for both 200 m and 500 m SuperMIMO channels. The x-axis may represent the SINR of each system in dB, and the y-axis may represent the CDF of the SINR of each system. As shown, the systems employing the disclosed precoder exhibit improved performance compared to the prior art.

Figure 8:
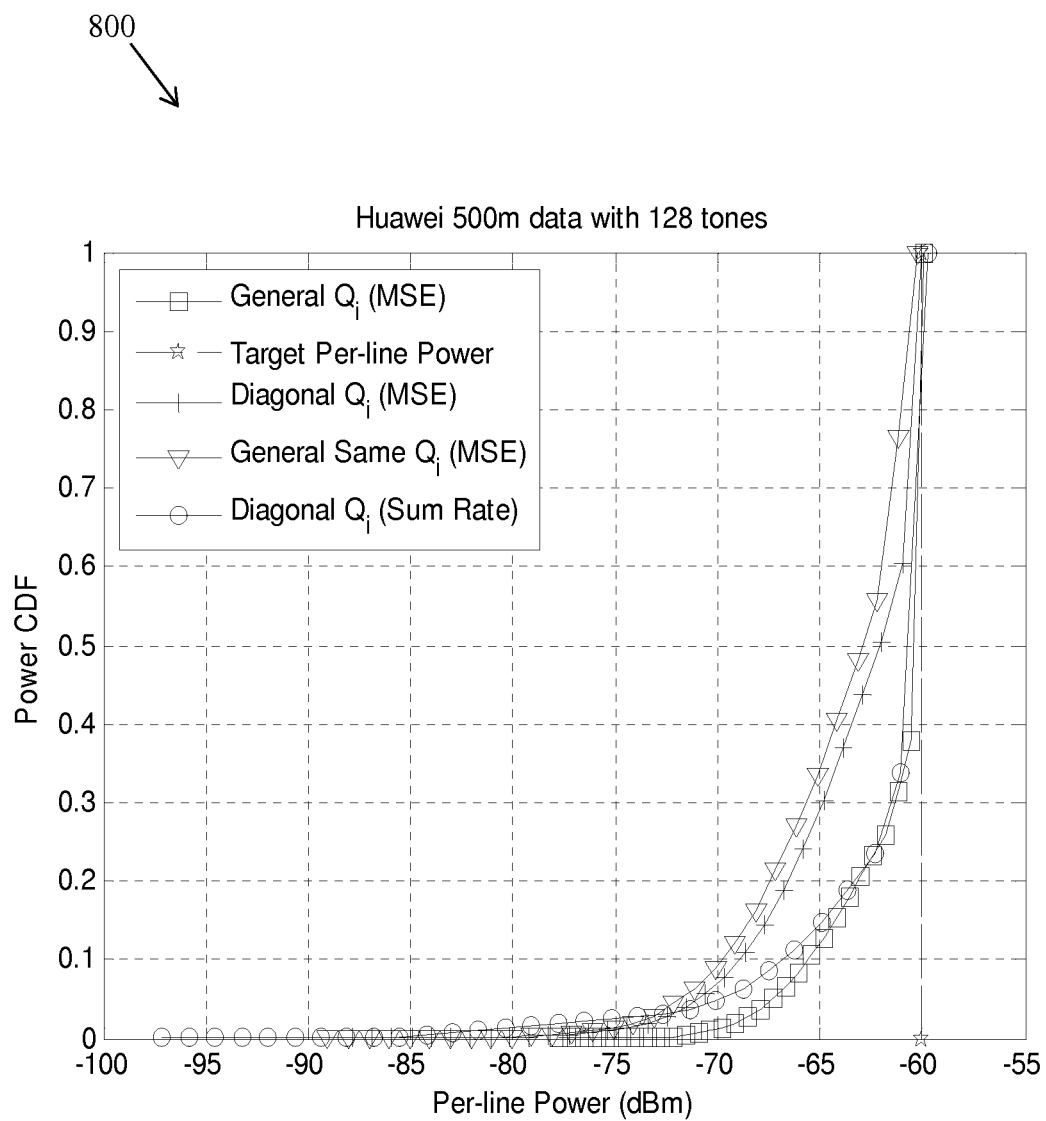
FIG. 8 is a graph comparing a CDF of power of systems employing various precoding options for a 500 m channel.

FIG. 8 is a graph 800 comparing the CDF of power of systems employing the disclosed precoder (i.e., MSE), a system with target per-line power, and a system employing the prior art (i.e., Sum Rate), all for a 500 m SuperMIMO channel. The x-axis may represent the per-line power of each system in dBm, and the y-axis may represent the CDF of the power of each system. As shown, the systems employing the disclosed precoder exhibit improved performance compared to the prior art.

Figure 9:
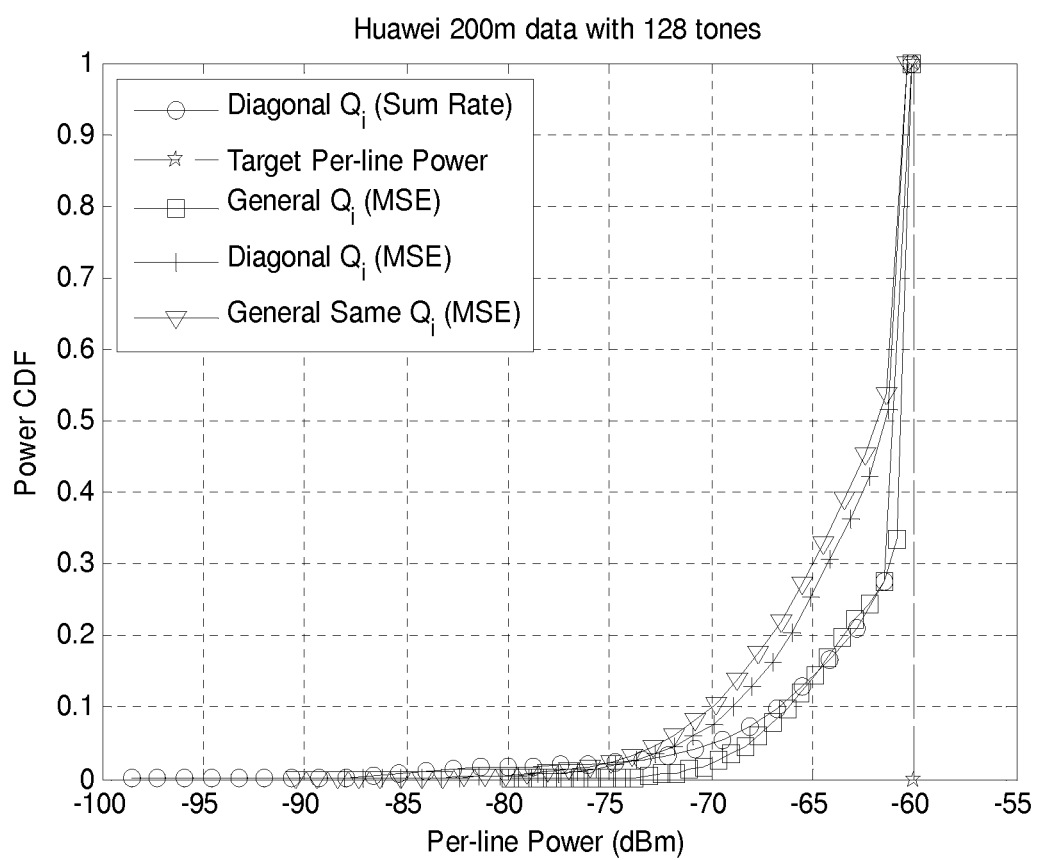
FIG. 9 is a graph comparing a CDF of power of systems employing various precoding options for a 200 m channel.

FIG. 9 is a graph 900 that is the same as the graph 800 discussed above, but for a 200 m Super MIMO channel. As shown, the results in the graph 900 are similar to the results in the graph 800.

The average SINR and power of each channel measured over 128 tones may be calculated, respectively, as follows:

$$SINR_{avg}(i) = \frac{1}{128}\sum_{j=1}^{128} SINR_{i,j},$$

$$(i = 1, \ldots, 48)$$

$$p_{avg}(i) = \frac{1}{128}\sum_{j=1}^{128} p_{i,j},$$

$$(i = 1, \ldots, 48).$$

Figure 10:
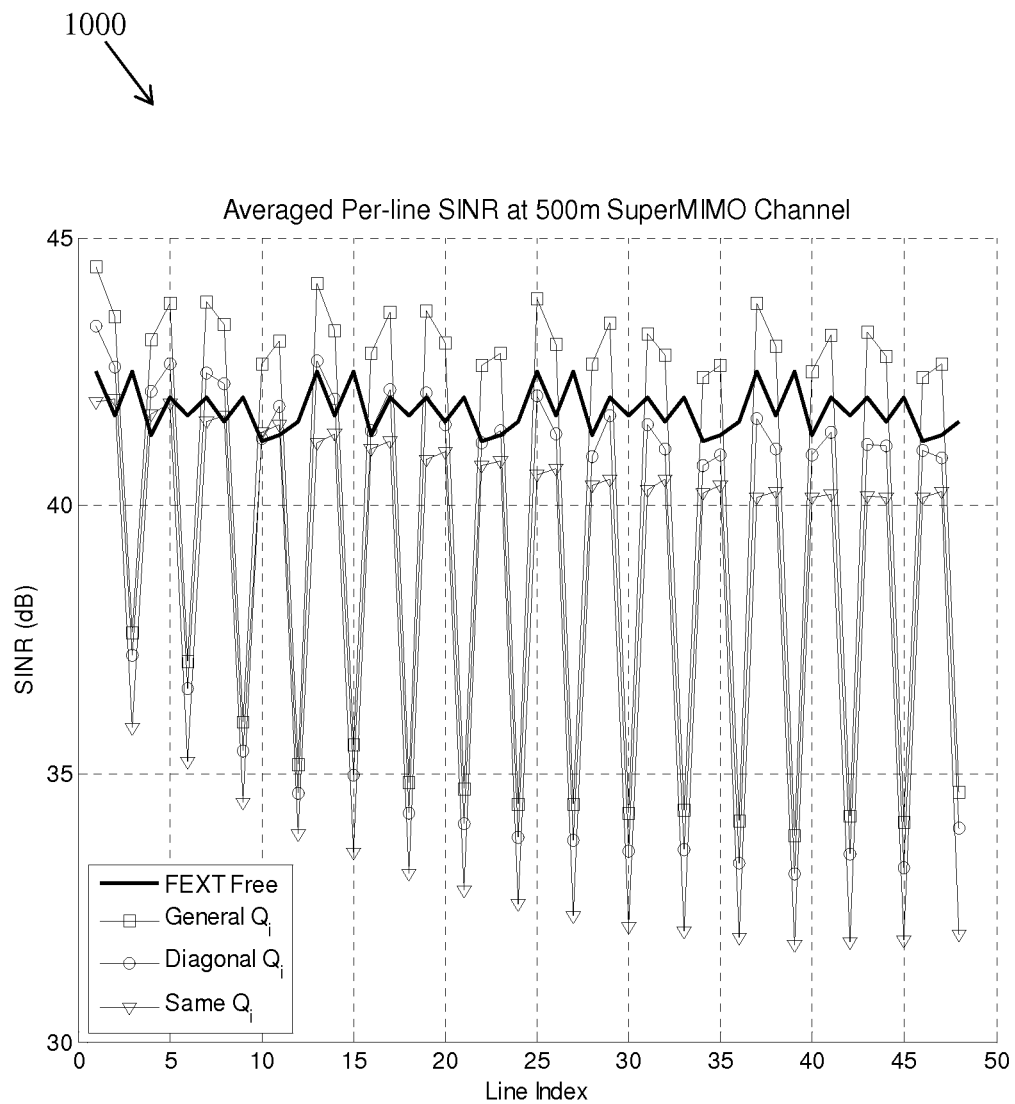
FIG. 10 is a graph comparing SINR of a system with no FEXT and systems employing a disclosed precoder for a 500 m channel.

FIG. 10 is a graph 1000 comparing the SINR of a system with no FEXT and systems employing the disclosed precoder (i.e., MSE), all for a 500 m SuperMIMO channel. The x-axis may represent the line index of each system, and the y-axis may represent the SINR of each system in dB. The line index is the line index of the physical SuperMIMO channel. As shown, the systems employing the disclosed precoder exhibit relatively high SINR, and, in the case of a general $Q_i$, higher SINR than the FEXT-free system.

Figure 11:
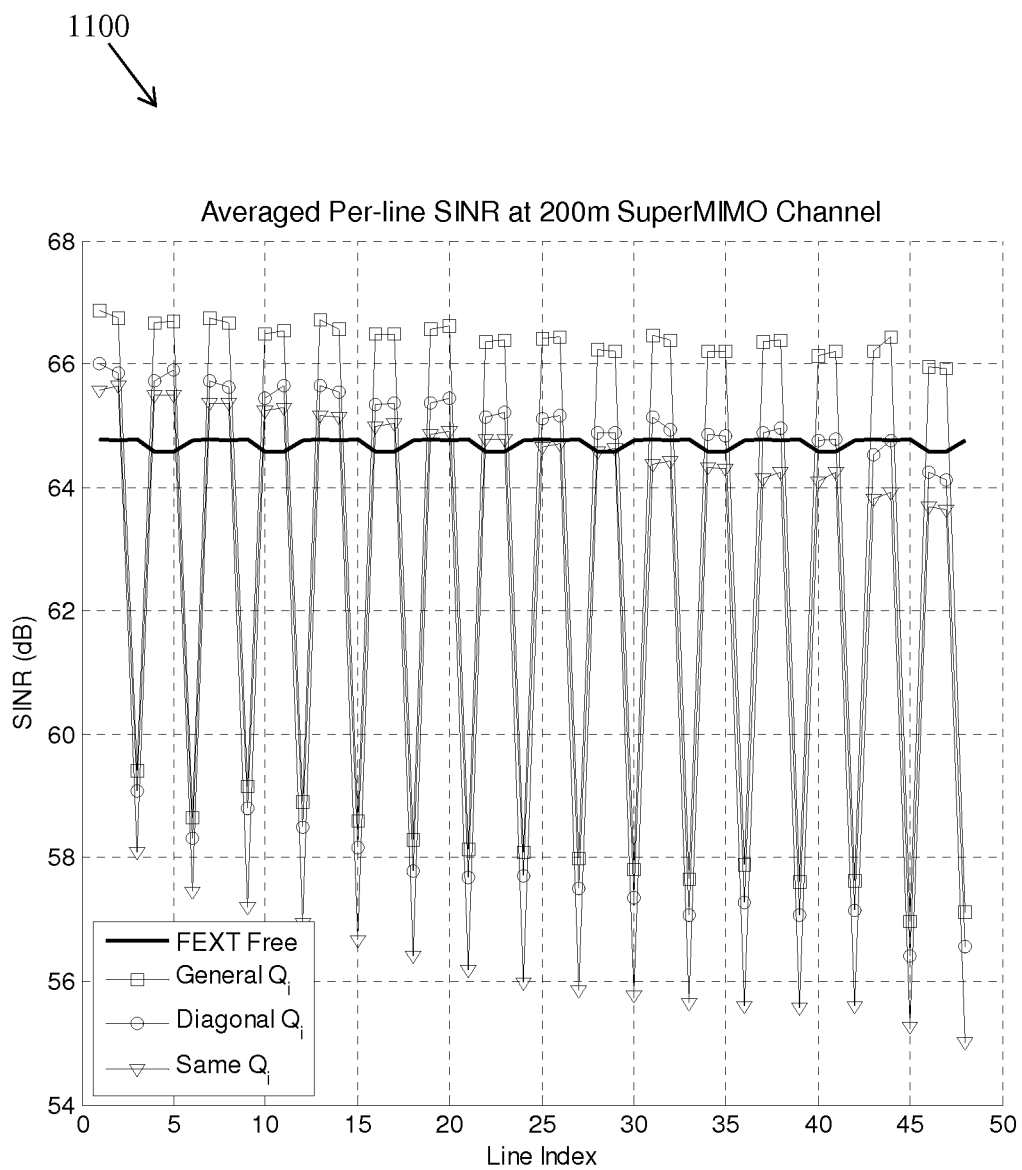
FIG. 11 is a graph comparing SINR of a system with no FEXT and systems employing a disclosed precoder for a 200 m channel.

FIG. 11 is a graph 1100 that is the same as the graph 1000 discussed above, but for a 200 m Super MIMO channel. As shown, the results in the graph 1100 are similar to the results in the graph 1000.

Figure 12:
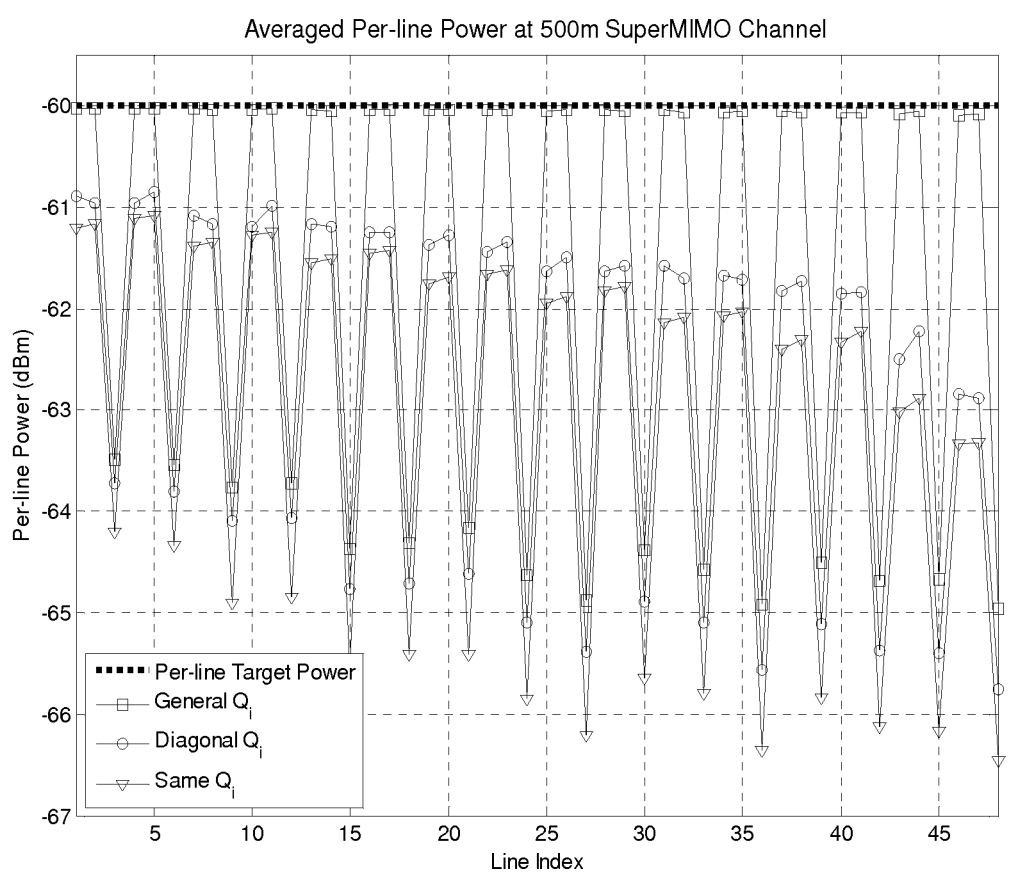
FIG. 12 is a graph comparing the per-line power of a system with target per-line power and systems employing a disclosed precoder for a 500 m channel.

FIG. 12 is a graph 1200 comparing the per-line power of a system with target per-line power and systems employing the disclosed precoder (i.e., MSE), all for a 500 m SuperMIMO channel. The x-axis may represent the line index of each system, and the y-axis may represent the per-line power of each system in dBm. As shown, the systems employing the disclosed precoder exhibit power allocation to each line in proportion to the corresponding sub-channel quality; no empty channels; and, in the case of a general $Q_i$, average DM line power almost near the desired value of −60 dBm.

Figure 13:
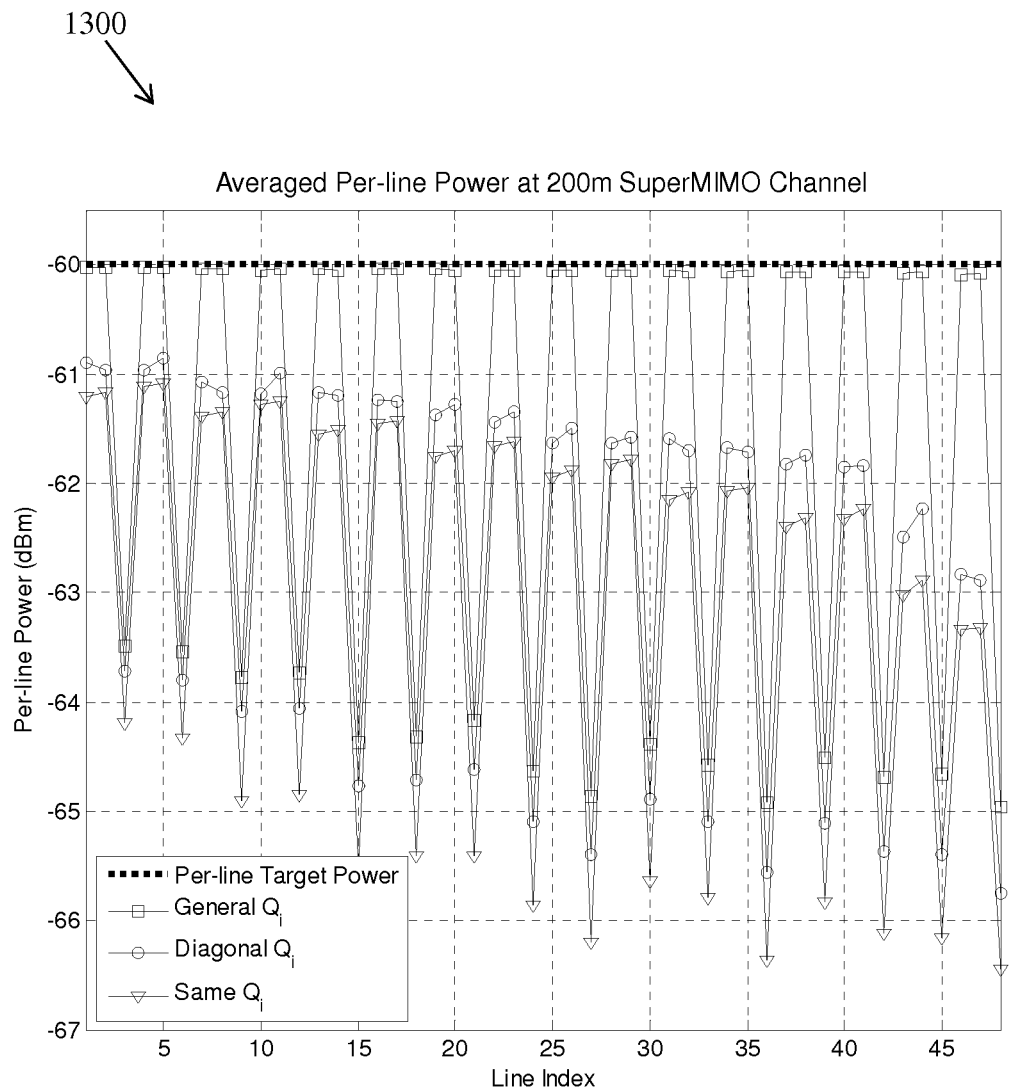
FIG. 13 is a graph comparing the per-line power of a system with target per-line power and systems employing a disclosed precoder for a 200 m channel

FIG. 13 is a graph 1300 that is the same as the graph 1200 discussed above, but for a 200 m SuperMIMO channel. As shown, the results in the graph 1300 are similar to the results in the graph 1200.

Per-line bit loading may be calculated as follows:

$$bit_i = \sum_{j=1}^{128} bit_{i,j},$$

$$(i = 1, \ldots, 48),$$

where $bit_{i,j}$ is the bit of the ith line and jth tone defined in (18).

Figure 14:
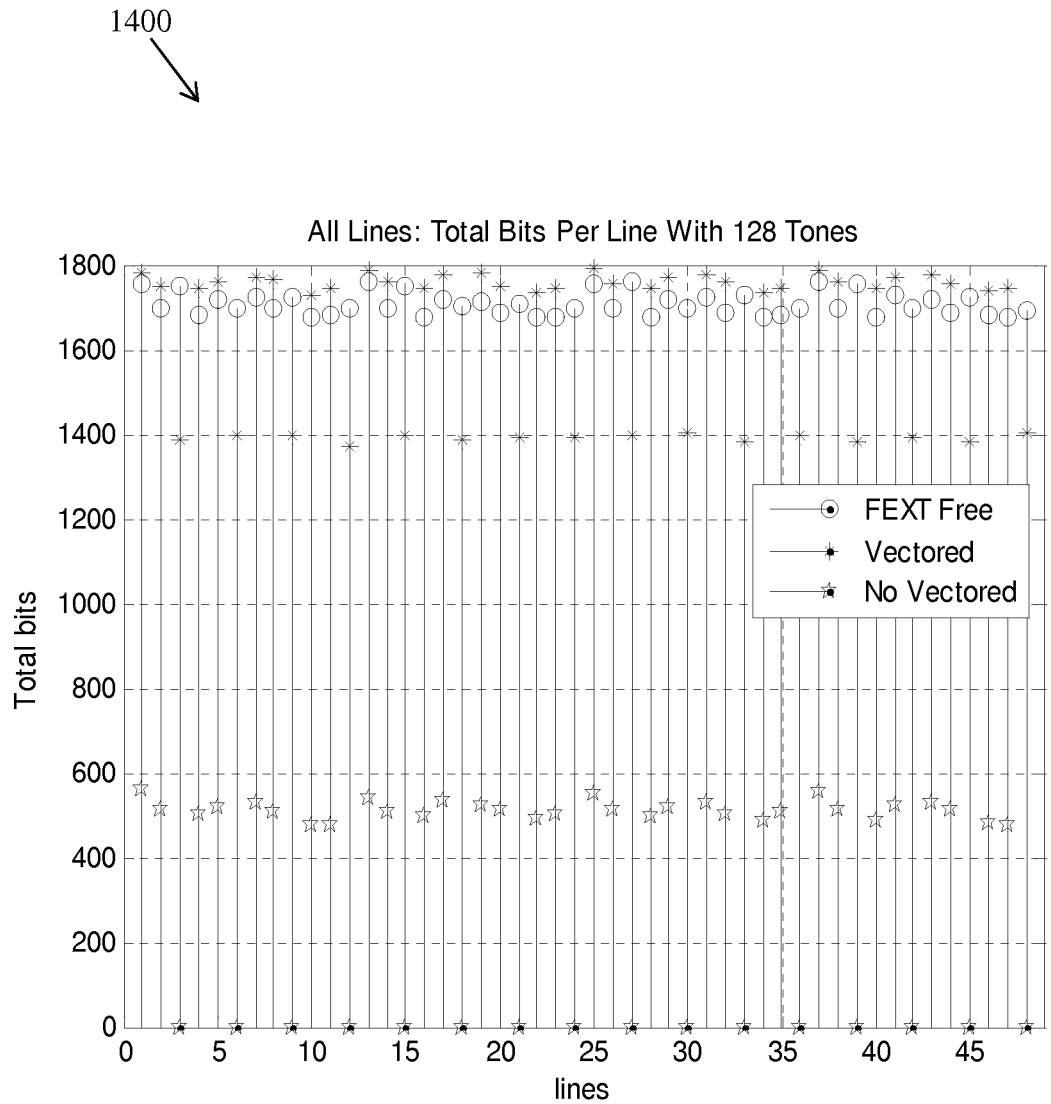
FIGS. 14-16 are graphs comparing the total bits of various systems for a 500 m channel.
Figure 15:
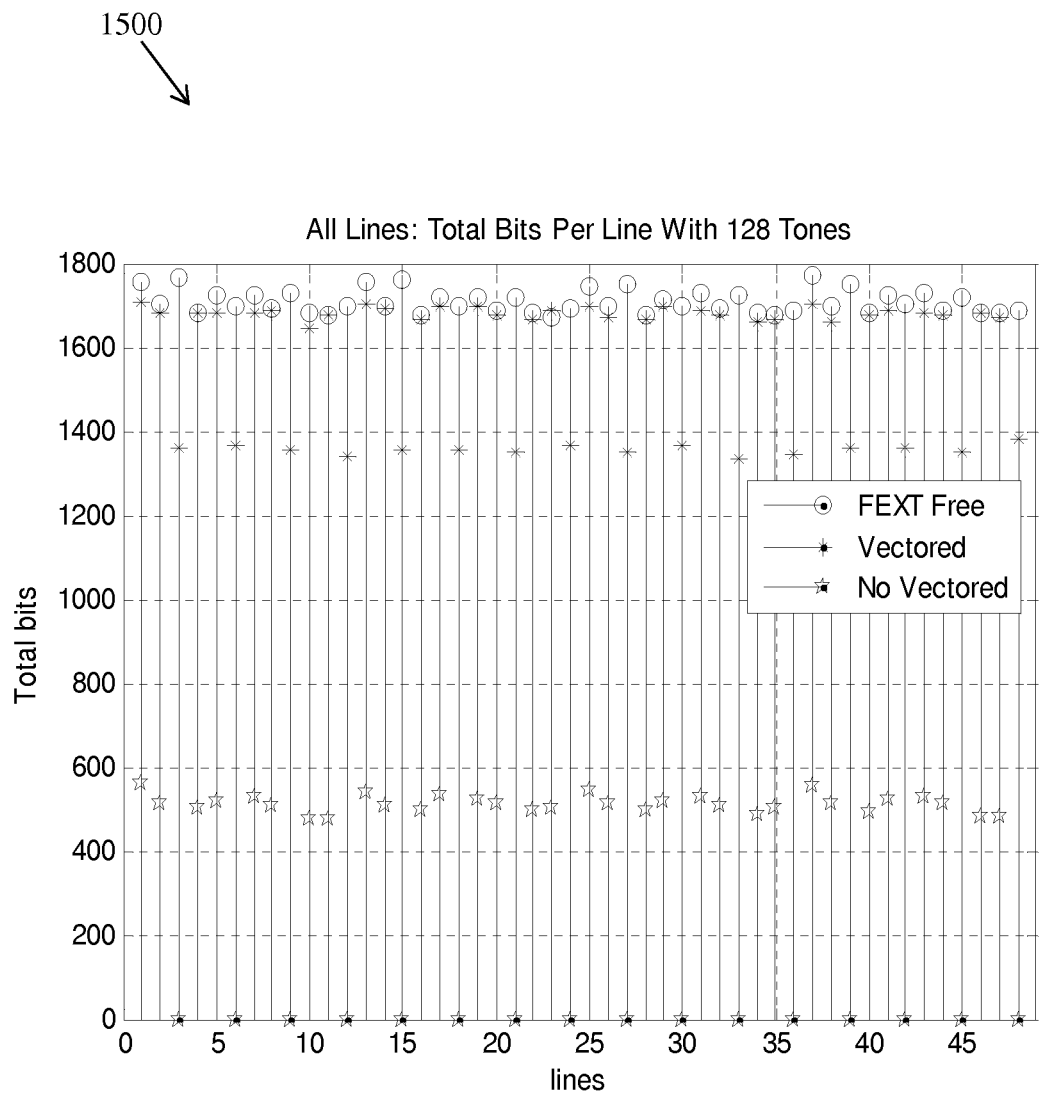
Figure 16:
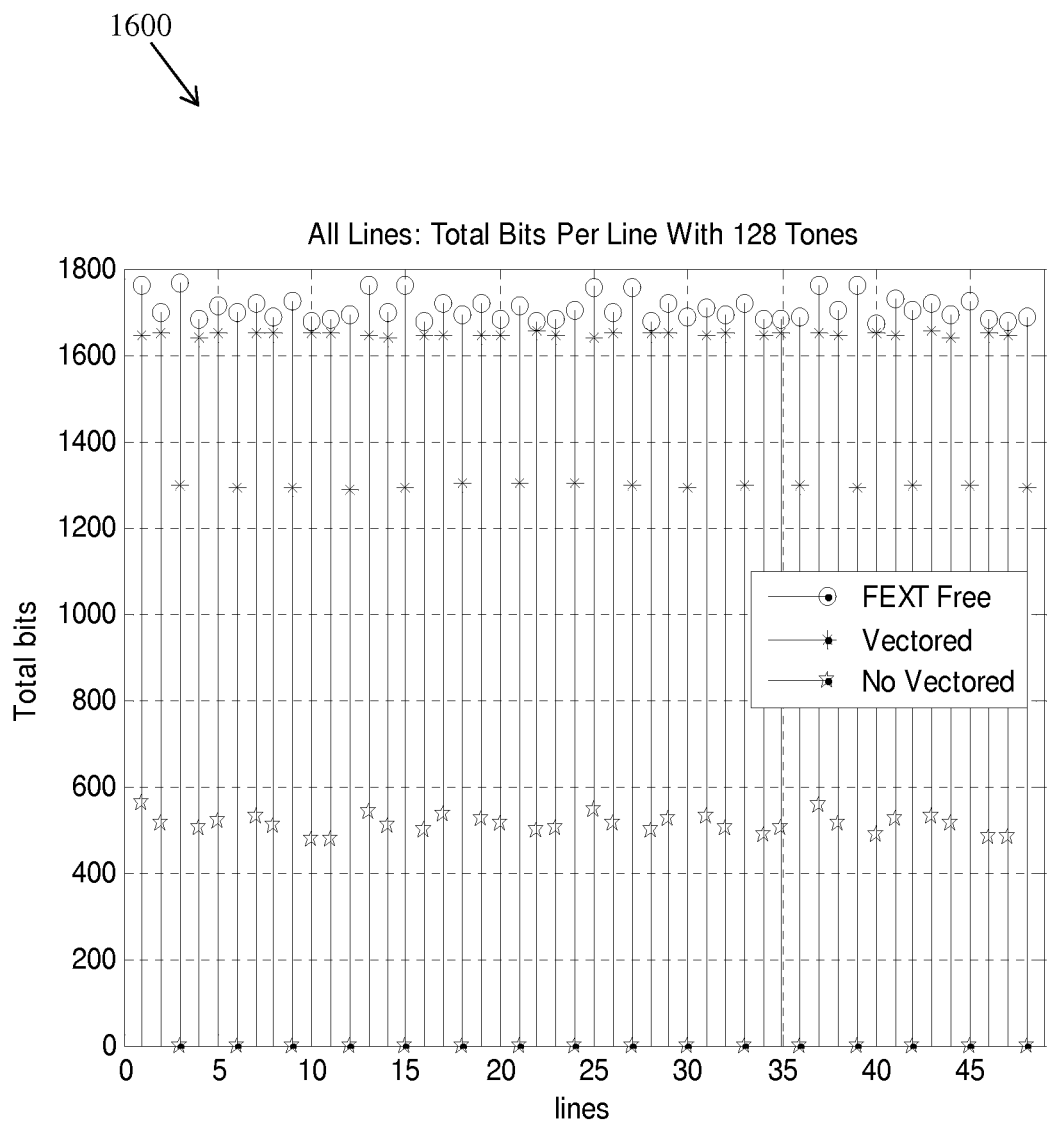

FIG. 14 is a graph 1400 comparing the total bits of a system with no FEXT, a no-vectored system, and a vectored system with general $Q_i$, all for a 500 m SuperMIMO channel. The x-axis may represent the line index of each system, and the y-axis may represent the total bits of each system. The total bits are the total bits assigned to the corresponding line. FIG. 15 is a graph 1500 that is the same as the graph 1400, but with a diagonal $Q_i$. FIG. 16 is a graph 1600 that is the same as the graph 1400, but with an equal general $Q_i$. As shown, the bit loading performance of the system with the general $Q_i$ exhibits the best bit loading performance.

Figure 17:
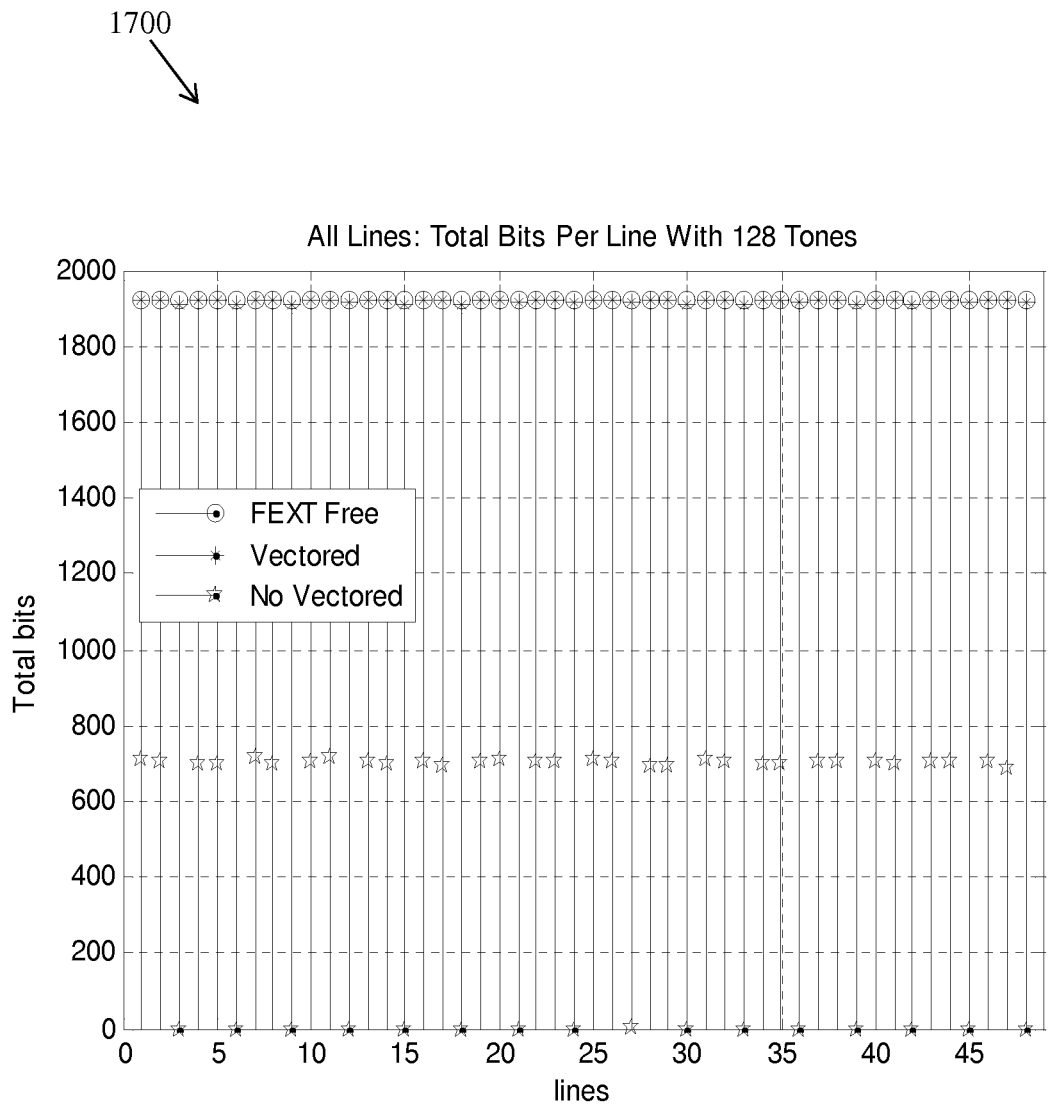
FIG. 17 is a graph comparing the total bits of various systems for a 200 m channel.
Figure 18:
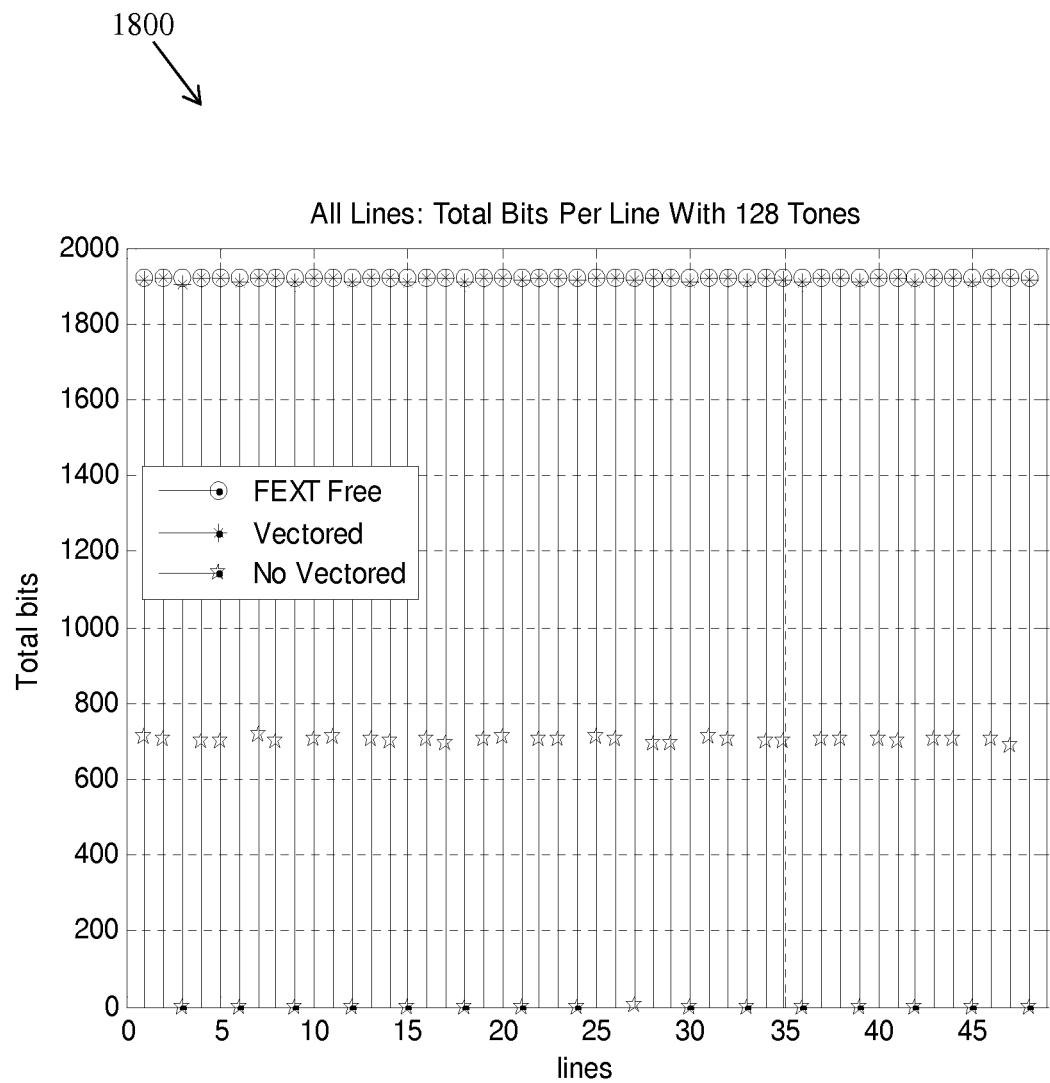
FIG. 18 is a graph with the same scenarios as for FIG. 15, but for a 200 m SuperMIMO channel.
Figure 19:
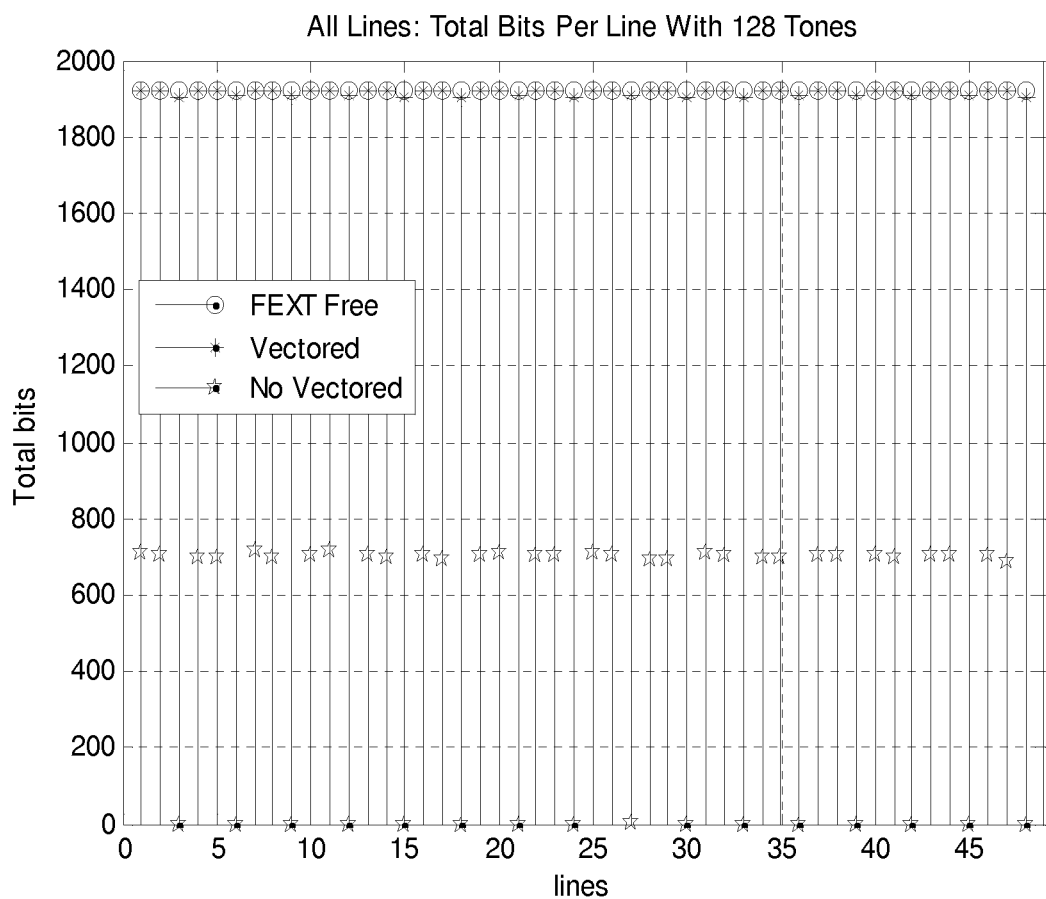
FIG. 19 is a graph with the same scenarios as for FIG. 16, but for a 200 m SuperMIMO channel.

FIG. 17 is a graph 1700 that is the same as the graph 1400 discussed above, but for a 200 m SuperMIMO channel. FIG. 18 is a graph 1800 that is the same as the graph 1500 discussed above, but for a 200 m SuperMIMO channel. FIG. 19 is a graph 1900 that is the same as the graph 1600, but for a 200 m SuperMIMO channel. As shown, the results in the graphs 1700, 1800, 1900 are similar to the results in the graphs 1400, 1500, 1600.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus configured to couple to a plurality of subscriber lines, the apparatus comprising:

a plurality of transmitters configured to couple to a plurality of physical channels and at least one virtual channel, wherein the number of physical channels equals the number of subscriber lines;

a processor configured to compute a precoder matrix to minimize an error value, wherein the error value accounts for an error on each channel subject to a constraint on power for each channel; and a precoder coupled to the processor and configured to use the precoder matrix to jointly process a plurality of data signals to generate a plurality of transmit signals for the plurality of physical channels and the at least one virtual channel, wherein computing the precoder matrix comprises computing a block diagonal matrix from a plurality of computed matrices $Q_i$ for i=1, 2, . . . , K, where K is the number of subscribers, and wherein the precoder matrix is based on the block diagonal matrix and a channel matrix, and wherein each $Q_i$ is selected as one of the following forms: each $Q_i$ is a unique positive semi-definite matrix, each $Q_i$ is a unique diagonal matrix, and each $Q_i$ is a positive semi-definite matrix with $Q_1=Q_2=\ldots=Q_K$.

2. The apparatus of claim 1, wherein $Q_i$ for 1, 2, . . . , K is obtained by solving $$\min_{Q_i(i=1\ldots K)} c^T t,$$

subject to the following constraints:

$$t = [t_1, \ldots, t_{J \times K}]^T \geq 0$$

$$\begin{bmatrix} t_{J \times j+i} & e_j^\dagger \\ e_j & Q_i \end{bmatrix} \geq 0,$$

$$(i = 1, \ldots, J, j = 1, \ldots, K)$$

$$\sum_{i=1}^{K} Tr(R_{ij} Q_i) \leq 1,$$

$$(l = 1, \ldots, J \times K)$$

where $R_{ij}$ is defined as $(H_i^{-1})^\dagger e_j e_j^\dagger H_i^{-1}$, where $H_i$ represents a subchannel matrix for the ith subscriber, where $c=[\sigma_1^2, \sigma_2^2, \ldots, \sigma_K^2]^T \otimes [1\ 1\ 1]^T$, and where $\sigma_i^2$ represents a noise level for the ith subscriber.

3. The apparatus of claim 2, wherein the block diagonal matrix is represented by B, and wherein $$B = diag(B_1, \ldots, B_K),$$

where $$B_i = Q_i^{\frac{1}{2}}.$$

4. The apparatus of claim 3, wherein the channel matrix is estimated during a training phase, wherein the precoder matrix is denoted as P, and wherein $$P = H^{-1} \cdot B,$$

where the channel matrix is denoted as H.

5. The apparatus of claim 1, wherein a plurality of transmitters is assigned to each subscriber such that each subscriber is assigned at least two physical channels and at least one virtual channel.

6. A method comprising:
receiving, by a plurality of receivers, a plurality of channel estimates comprising a channel estimate for each of a plurality of channels;
computing a block diagonal matrix for a precoder matrix to minimize an error value subject to a per-channel constraint on signal power; and
computing the precoder matrix based on the block diagonal matrix and the channel estimates,
wherein the block diagonal matrix is computed from a plurality of computed matrices $Q_i$ for i=1, 2, . . . , K, where K is the number of subscribers, and wherein each $Q_i$ is selected as one of the following forms: each $Q_i$ is a unique positive semi-definite matrix, each $Q_i$ is a unique diagonal matrix, and each $Q_i$ is a positive semi-definite matrix with $Q_1=Q_2=\ldots=Q_K$.

7. The method of claim 6, wherein the block diagonal matrix B is based on $Q_i$ for i=1, 2, . . . , K, and wherein each $Q_i$ is determined by minimizing the error value subject to the per-channel constraint on signal power.

8. The method of claim 6, wherein $Q_i$ for 1, 2, . . . , K is obtained by solving $$\min_{Q_i (i=1 \ldots K)} c^T t,$$

subject to the following constraints:

$$t = [t_1, \ldots, t_{J \times K}]^T \geq 0$$

$$\begin{bmatrix} t_{J \times j+i} & e_j^\dagger \\ e_j & Q_i \end{bmatrix} \geq 0,$$

$$(i = 1, \ldots, J, j = 1, \ldots, K)$$

$$\sum_{i=1}^{K} Tr(R_{lj} Q_i) \leq 1,$$

$$(l = 1, \ldots, J \times K)$$

where $R_{ij}$ is defined as $(H_i^{-1})^\dagger e_j e_j^\dagger H_i^{-1}$, where $H_i$ represents a subchannel matrix for the ith subscriber, where $c = [\sigma_i^2, \sigma_2^2, \ldots, \sigma_K^2]^T \otimes [1\ 1\ 1]^T$, and where $\sigma_i^2$ represents a noise level for the ith subscriber.

9. The method of claim 8, wherein the block diagonal matrix is represented by B, and wherein $$B = diag(B_1, \ldots, B_K),$$

where $$B_i = Q_i^{\frac{1}{2}}.$$

10. The method of claim 9, wherein a channel matrix H is constructed using the plurality of channel estimates, wherein the precoder matrix is denoted as P, and wherein the precoder matrix P is computed as $P = H^{-1} \cdot B$.

11. The method of claim 10, wherein the plurality of channels comprises a plurality of physical channels and a plurality of virtual channels, wherein the number of virtual channels is one less than the number of physical channels.

12. An apparatus comprising:
a plurality of receivers configured to receive a plurality of channel estimates comprising a channel estimate for each of a plurality of channels; and
a processor configured to:
compute a block diagonal matrix for a precoder matrix to minimize an error value subject to a per-channel constraint on signal power, and
compute the precoder matrix based on the block diagonal matrix and the channel estimates,
wherein the block diagonal matrix is computed based on a plurality of matrices $Q_i$ for i=1, 2, . . . , K, where K is the number of subscribers, and wherein each $Q_i$ is selected as one of the following forms: each $Q_i$ is a unique positive semi-definite matrix, each $Q_i$ is a unique diagonal matrix, and each $Q_i$ is a positive semi-definite matrix with $Q_1=Q_2=\ldots=Q_K$.

13. The apparatus of claim 12, wherein the block diagonal matrix B is based on $Q_i$ for i=1, 2, . . . , K, and wherein each $Q_i$ is determined by minimizing the error value subject to the per-channel constraint on signal power.

14. The apparatus of claim 12, wherein $Q_i$ for 1, 2, . . . , K is obtained by solving $$\min_{Q_i (i=1 \ldots K)} c^T t,$$

subject to the following constraints:

$$t = [t_1, \ldots, t_{J \times K}]^T \geq 0$$

$$\begin{bmatrix} t_{J \times j+i} & e_j^\dagger \\ e_j & Q_i \end{bmatrix} \geq 0,$$

$$(i = 1, \ldots, J, j = 1, \ldots, K)$$

$$\sum_{i=1}^{K} Tr(R_{lj} Q_i) \leq 1,$$

$$(l = 1, \ldots, J \times K)$$

where $R_{ij}$ is defined as $(H_i^{-1})^\dagger e_j e_j^\dagger H_i^{-1}$, where $H_i$ represents a subchannel matrix for the ith subscriber, where $c = [\sigma_i^2, \sigma_2^2, \ldots, \sigma_K^2]^T \otimes [1\ 1\ 1]^T$, and where $\sigma_i^2$ represents a noise level for the ith subscriber.

15. The apparatus of claim 13, wherein the block diagonal matrix is represented by B, and wherein $$B = diag(B_1, \ldots, B_K),$$

where $$B_i = Q_i^{\frac{1}{2}}.$$

16. The apparatus of claim 14, wherein a channel matrix H is constructed using the plurality of channel estimates, wherein the precoder matrix is denoted as P, and wherein the precoder matrix P is computed as $P = H^{-1} B$.

17. The apparatus of claim 16, wherein the plurality of channels comprises a plurality of physical channels and a plurality of virtual channels, wherein the number of virtual channels is one less than the number of physical channels.

* * * * *